US011118083B2

(12) United States Patent
Willerich et al.

(10) Patent No.: US 11,118,083 B2
(45) Date of Patent: Sep. 14, 2021

(54) LATEX PAINT CONTAINING TITANIUM DIOXIDE PIGMENT

(71) Applicant: BASF SE, Ludwigshafen am Rhein (DE)

(72) Inventors: Immanuel Willerich, Limburgerhof (DE); Volodymyr Boyko, Mannheim (DE); Bernd Reck, Gruenstadt (DE); Jules Mikhael, Mannheim (DE); Joost Leswin, Mannheim (DE); Matthias Maier, Sandhausen (DE); Tanja Rost, Mannheim (DE); Markus Rueckel, Mannheim (DE)

(73) Assignee: BASF SE, Ludwigshafen am Rhein (DE)

( * ) Notice: Subject to any disclaimer, the term of this patent is extended or adjusted under 35 U.S.C. 154(b) by 311 days.

(21) Appl. No.: 16/336,565

(22) PCT Filed: Oct. 6, 2017

(86) PCT No.: PCT/EP2017/075477
§ 371 (c)(1),
(2) Date: Mar. 26, 2019

(87) PCT Pub. No.: WO2018/065574
PCT Pub. Date: Apr. 12, 2018

(65) Prior Publication Data
US 2021/0163779 A1    Jun. 3, 2021

(30) Foreign Application Priority Data
Oct. 7, 2016   (EP) .................................... 16192869

(51) Int. Cl.
C09D 151/00   (2006.01)
C09D 5/02     (2006.01)
C08K 3/22     (2006.01)

(52) U.S. Cl.
CPC ......... *C09D 151/003* (2013.01); *C09D 5/027* (2013.01); *C09D 5/028* (2013.01); *C08K 2003/2241* (2013.01)

(58) Field of Classification Search
CPC .... C09D 151/003; C09D 5/027; C09D 5/028; C08K 2003/2241
USPC ........................................................ 524/561
See application file for complete search history.

(56) References Cited

U.S. PATENT DOCUMENTS

| | | | |
|---|---|---|---|
| 4,079,028 A | 3/1978 | Emmons et al. | |
| 4,155,892 A | 5/1979 | Emmons et al. | |
| 4,269,749 A | 5/1981 | Marriott et al. | |
| 4,468,498 A | 8/1984 | Kowalski et al. | |
| 4,554,307 A * | 11/1985 | Farrar | C08F 6/04 524/425 |
| 6,080,802 A | 6/2000 | Emmons et al. | |
| 6,197,104 B1 | 3/2001 | Kostelnik et al. | |
| 2001/0007231 A1 | 7/2001 | Kostelnik et al. | |
| 2011/0166291 A1 | 7/2011 | Türk et al. | |
| 2018/0305471 A1* | 10/2018 | Balk | C08F 2/26 |

FOREIGN PATENT DOCUMENTS

| | | |
|---|---|---|
| CA | 2 966 678 A1 | 5/2016 |
| EP | 0 061 822 A1 | 10/1982 |
| EP | 0 307 775 A2 | 3/1989 |
| EP | 0 612 329 | 8/1994 |
| EP | 0 615 534 | 9/1994 |
| EP | 0 771 328 | 5/1997 |
| EP | 1 013 264 A1 | 6/2000 |
| EP | 1 398 333 A1 | 3/2004 |
| EP | 1 541 643 A1 | 6/2005 |
| EP | 1 584 331 A1 | 10/2005 |
| EP | 2 184 304 A1 | 5/2010 |
| EP | 2 426 155 A1 | 3/2012 |
| EP | 2 692 752 A1 | 2/2014 |

(Continued)

OTHER PUBLICATIONS

International Search Report dated Dec. 8, 2017 in PCT/EP2017/075477, citing documents AE, AX, BN, BO, and BP, 4 pages.
Van Dyk, A., et al., "Shear rate-dependent structure of polymer-stabilized TiO$_2$ dispersions", J. Coat. Technol. Res., vol. 10 No. 3, XP035364525, Mar. 6, 2013, pp. 297-303.
Kostansek, E., "Controlling particle dispersion in latex paints containing associative thickeners", J. Coat. Technol. Res., vol. 4 No. 4, 2007, pp. 375-388.

* cited by examiner

*Primary Examiner* — Hui H Chin
(74) *Attorney, Agent, or Firm* — Faegre Drinker Biddle & Reath LLP

(57) ABSTRACT

The present invention relates to latex paints containing a) a multistage carboxylated polymer latex binder obtainable by multistage aqueous emulsion polymerisation of at least one non-ionic monomer which is selected from $C_1$-$C_{20}$-alkyl esters of acrylic acid, $C_1$-$C_{20}$-alkylesters of methacrylic acid, and vinyl aromatic monomers; one or more monoethylenically unsaturated monomers M2, which are selected from monoethylenically unsaturated monocarboxylic acids having 3 to 6 carbon atoms and monoethylenically unsaturated dicarboxylic acids having 4 to 6 carbon atoms, and where in at least one stage, monomers M2 added in this stage is at least 6% by weight; b) a titanium dioxide pigment; c) a polymeric dispersant selected from monoethylenically unsaturated monocarboxylic acids having 3 to 6 carbon atoms and monoethylenically unsaturated dicarboxylic acids having 4 to 6 carbon atoms, where the monomers make up at least 85% of the monomers forming the polymeric dispersant; and d) a thickener polymer.

17 Claims, No Drawings

(56) References Cited

FOREIGN PATENT DOCUMENTS

| | | |
|---|---|---|
| EP | 2 692 753 A1 | 2/2014 |
| EP | 2 886 614 A2 | 6/2015 |
| EP | 2 886 615 A1 | 6/2015 |
| EP | 2 915 855 A1 | 9/2015 |
| EP | 2 918 615 A1 | 9/2015 |
| EP | 3 002 301 A1 | 4/2016 |
| EP | 3 018 148 A1 | 5/2016 |
| WO | WO 93/10166 A1 | 5/1993 |
| WO | WO 93/12183 A1 | 6/1993 |
| WO | WO 95/33775 A1 | 12/1995 |
| WO | WO 96/31550 A1 | 10/1996 |
| WO | WO 99/57075 A1 | 11/1999 |
| WO | WO 2012/052508 A2 | 4/2012 |

LATEX PAINT CONTAINING TITANIUM DIOXIDE PIGMENT

The present invention relates to latex paints, which contain
a) a multistage carboxylated polymer latex binder obtainable by multistage aqueous emulsion polymerisation;
b) a titanium dioxide pigment;
c) a polymeric dispersant PD; and
d) an associative thickener polymer.

The invention also relates to a method for producing such latex paints and to the use of the latex paints for coating surfaces, in particular for coating interior or exterior walls and ceilings.

BACKGROUND OF INVENTION

Titanium dioxide ($TiO_2$) is frequently used as a pigment in water-borne coating compositions, such as latex paints. Besides whiteness, $TiO_2$ provides opacity or hiding power to the coating. The opacifying capacity or hiding power of such a coating or paint is a measure of the coating's ability to conceal a surface to which the coating is applied.

The opacifying capacity is a function of the spacing between the particles of opacifying pigment in the dried applied coating (see U.S. Pat. No. 6,080,802, EP 1398333 and EP 2426155). The opacifying capacity of a coating is maximized when the light scattering capability of the opacifying pigment, namely $TiO_2$, is maximized. Maximum light scattering efficiency occurs when the $TiO_2$ pigment particles have a certain diameter and spacing, so that the light scattering capability of each particle does not interfere with the light scattering capability of its neighboring particles. This condition may occur in coatings containing sufficiently low levels of $TiO_2$ such that the individual $TiO_2$ particles are isolated from each other. Coatings containing such low levels of $TiO_2$, however, do not provide sufficient whiteness and hiding at typical dried coating thicknesses. Achieving the desired levels of hiding and whiteness typically requires higher levels of $TiO_2$. At higher levels, a statistical distribution of $TiO_2$ particles will result in $TiO_2$ particles (at least some) being in closer proximity to one another, which lowers their light scattering efficiency due to crowding.

Summarizing, the efficacy of the $TiO_2$ pigment as a hiding or opacifying pigment is reduced, when the $TiO_2$ particles are not homogeneously dispersed in the coating composition. In fact, $TiO_2$ particles tend to agglomerate upon film formation and drying.

U.S. Pat. No. 6,080,802 discloses coating compositions for obtaining coatings with improved opacity at a given pigment level, which contain polymer composite particles, wherein the polymeric latex particles are absorbed onto a titanium dioxide particle.

Modern latex paints often contain associative rheology modifiers, also termed associative thickeners. There are mainly two reasons for using associative thickeners: decreased low shear viscosity leading to better flow and leveling and increased high shear viscosity leading to higher film build and improved brush feel. Unfortunately, associative thickeners result in a reduced hiding power and flocculation, in particular when combined with polymeric carboxylic acid dispersants, as either the associative thickeners tend to solely adsorb onto the latex particles, thereby resulting in crowding of the pigment particles for non-adsorbing latex types (see e.g. E. Kostansek, J. Coat. Technol. Res., 4(4) (2007) pp. 375-388), or, in the same case, adsorbing latex types may have a reduced capability to adsorb to the pigment or tend to have post-thickening problems.

A first approach for improving the opacifying efficiency of latex paints is based on the use of binders, which contain phosphorous containing monomers, as these latices adsorb better to the pigment particles. For example EP 1398333 A1 and EP 2426155 A1 teach that the spacing of $TiO_2$ pigment particles and its resultant efficiency can be improved by employing a multistage polymer latex containing polymerized phosphor containing acid monomers. Said phosphor containing monomers, however, are expensive. Moreover, the coating formulations are not always stable and tend to flocculate resulting in the formation of grit in the coatings.

Alternatively, the opacifying efficiency of latex paints can be improved by the use of particular dispersants, which should ameliorate the negative impact of associative thickeners on hiding power and flocculation.

EP 2886614 discloses the combination of an itaconic acid functionalized binder latex with a water soluble polymer functionalized with sulfonic acid monomers in order to avoid the problems associated with binders, which contain phosphorous containing monomers.

EP 2886615 suggests that the stability of a titanium dioxide containing paint formulations, which contains a binder functionalized with a phosphorous acid monomer can be improved by using a binder containing only small amounts of phosphorous acid monomer in combination with a water soluble polymer functionalized with sulfonic acid monomers and titanium dioxide. Similar latex paint compositions are known from EP 2918615.

EP 2692752 and EP 2692753 seek to overcome the problem associated with the use of associative thickeners by using polymeric dispersants, which are copolymers of sulfonic acid monomers and one or more further co-monomers selected from certain cationic (meth)acrylate type monomers, certain neutral or basic non-ionic monomers and optionally acrylic acid and methacrylic acid.

EP 2915855 seeks to overcome the problem associated with the use of associative thickeners by using polymeric dispersants, which have structural units of a carboxylic acid ester monomer, such as methyl methacrylate and tris(hydroxymethyl)-aminomethane. The dispersants are obtained by polymer analogue reaction of a polymer of ester monomers with tris(hydroxymethyl)aminomethane.

EP 3002301 describes aqueous coating compositions having a good hiding or opacifying efficacy, which contain as a pigment dispersant a copolymer of 10 to 30 or 15 to 40% by weight of carboxylic acid monomers and from 5 to 95% by weight of certain N-containing monomers, such as aminoalkyl (meth)acrylates or aminoalkyl (meth)acrylamides and the quaternary ammonium analogues thereof, vinylpyridines and vinylpyrrolidone.

The means suggested by the prior art for improving the hiding power or opacifying efficacy of the $TiO_2$ pigments are not satisfactory, as either the polymer dispersion requires expensive phosphorous-containing monomers for achieving acceptable hiding or opacifying efficacy and flocculation stability or the formulations require additional expensive dispersants or tedious methods of preparing the $TiO_2$ pigment/polymer pre-composites.

SUMMARY OF INVENTION

The object of the present invention is to provide latex paints having good hiding power/opacifying efficiency without requiring expensive phosphor containing monomers in the polymer latex. Moreover, there should be no need for expensive or difficult to prepare dispersants. In particular, there should be no restrictions with regard to using associative thickeners for adjusting the rheology properties of the latex paints. The latex paints should be stable and do not tend to form grit. Moreover, the aqueous polymer dispersion should provide good scrub resistance of the obtained coatings.

It was surprisingly found that these objectives can be achieved by the latex paints described herein. Therefore, the invention in a first aspect relates to latex paints which contain:

a) a multistage carboxylated polymer latex binder obtainable by multistage aqueous emulsion polymerisation of a monomer composition M consisting of
  at least one non-ionic monomer M1, which is selected from $C_1$-$C_{20}$-alkyl esters of acrylic acid, $C_1$-$C_{20}$-alkylesters of methacrylic acid, and vinyl aromatic monomers;
  one or more monoethylenically unsaturated monomers M2, which are selected from monoethylenically unsaturated monocarboxylic acids having 3 to 6 carbon atoms and monoethylenically unsaturated dicarboxylic acids having 4 to 6 carbon atoms, and
  optionally one or more non-ionic monomers M3, which are different from monomers M1;
  where in at least one stage, the relative amount of monomers M2 added in this stage is at least 6% by weight, based on the total amount of monomers added in said stage, the total amount of monomers M2 being from 0.05 to 5% by weight, based on the total amount of the monomer composition M;
b) a titanium dioxide pigment;
c) a polymeric dispersant PD which is selected from homo and copolymers of monomers M4, which are selected from monoethylenically unsaturated monocarboxylic acids having 3 to 6 carbon atoms and monoethylenically unsaturated dicarboxylic acids having 4 to 6 carbon atoms, where the monomers M4 make up at least 85% of the monomers forming the polymeric dispersant; and
d) an associative thickener polymer.

The invention also relates to method for preparing the latex paints, which method comprises:
i. preparing an aqueous suspension of the titanium dioxide pigment in the presence of the polymeric dispersant PD;
ii. addition of the polymer latex to the aqueous suspension of the titanium dioxide pigment to obtain an aqueous dispersion of the titanium dioxide pigment and the polymer latex particles; and
iii. addition of the associative thickener polymer to the suspension of step i. and/or to the dispersion of step ii.

The latex paints of the present invention provide good hiding power/opacifying efficiency without the need for expensive monomers or expensive dispersants.

Moreover, the desired viscosity properties, e.g. a decreased low shear viscosity and/or increased high shear viscosity, can be adjusted without adversely affecting the hiding/opacifying efficacy of the paint. The latex paints are stable and do not tend to form grit. Moreover, the latex paint provide good scrub resistance of the obtained coatings.

Therefore, the present invention also relates to the use of the latex paints of the invention as described herein for coating surfaces, in particular for coating interior or exterior walls and ceilings.

DETAILED DESCRIPTION OF INVENTION

Here and hereinafter, the prefixes $C_n$-$C_m$ used in connection with compounds or molecular moieties each indicate a range for the number of possible carbon atoms that a molecular moiety or a compound can have.

The term $C_1$-$C_n$ alkyl denominates a group of linear or branched saturated hydrocarbon radicals having from 1 to n carbon atoms. For example, the term $C_1$-$C_{20}$ alkyl denominates a group of linear or branched saturated hydrocarbon radicals having from 1 to 20 carbon atoms. Similarly, term $C_5$-$C_{20}$ alkyl denominates a group of linear or branched saturated hydrocarbon radicals having from 5 to 20 carbon atoms, while the term $C_1$-$C_4$ alkyl denominates a group of linear or branched saturated hydrocarbon radicals having from 1 to 4 carbon atoms. Examples of alkyl include but are not limited to methyl, ethyl, n-propyl, isopropyl, n-butyl, 2-butyl, 2-methylpropyl (isopropyl), 1,1-dimethylethyl (tert.-butyl), pentyl, 1-methylbutyl, 2-methylbutyl, 3-methylbutyl, 2,2-dimethylpropyl, 1-ethylpropyl, hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, heptyl, octyl, 2-ethylhexyl, nonyl, decyl, undecyl, dodecyl, tridecyl, tetradecyl, pentadecyl, hexadecyl, heptadecyl, octadecyl, nonadecyl, eicosyl, heneicosyl docosyl and their isomers. $C_1$-$C_4$-alkyl means for example methyl, ethyl, propyl, 1-methylethyl, butyl, 1-methylpropyl, 2-methylpropyl or 1,1-dimethylethyl.

Polymerization conditions are generally understood to mean those temperatures and pressures under which the free-radically initiated aqueous emulsion polymerization proceeds at sufficient polymerization rate. They depend particularly on the free-radical initiator used. Advantageously, the type and amount of the free-radical initiator, polymerization temperature and polymerization pressure are selected such that a sufficient amount of initiating radicals is always present to initiate or to maintain the polymerization reaction.

Here and throughout the specification, the term pphm (parts per hundred monomers) is used as a synonym for the relative amount of a certain monomer to the total amount of monomer in % by weight. For example, x pphm monomer M2 means x % by weight of monomers M2, based on the total amount of monomers. In the context of a stage, the value pphm refers to the relative amount or level of a specific monomer with regard to the total amount of the monomers added at said stage. For example, x pphm monomer M2 in a stage means that the relative amount or level of said monomer M2 in said stage is x % by weight, based on the total amount of monomers added in said stage. An increase of y pphm means that the level of a specific monomer is increased by y % by weight from a first level of m % by weight to a second level of m+y % by weight.

Here and throughout the specification, the term (meth)acryl includes both acryl and methacryl groups. Hence the term (meth)acrylate includes acrylate and methacrylate and the term (meth)acrylamide includes acrylamide and methacrylamide.

As a component a) the latex paint of the invention contains a multistage carboxylated polymer latex binder, which is obtainable by multistage aqueous emulsion polymerisation of a monomer composition M. The term "multistage" in the context of aqueous emulsion polymerisation is well understood to mean that the relative concentration of the monomers in the monomer composition M added to the polymerisation reaction is altered at least once during the aqueous emulsion polymerisation. Such a procedure results in at least two polymer populations of different monomer compositions in the polymer particles of the latex.

According to the present invention, in at least one stage S the level of monomers M2 added in this stage is at least 6% by weight, in particular at least 7% by weight, more particularly at least 8% by weight, especially at least 9% by weight or at least 10% by weight, based on the total amount of monomers added in said stage. This at least one stage is also termed stage S.

As the average level of monomers M2 in the monomer composition M added to the emulsion polymerisation through all stages is from 0.05 to 5% by weight, based on the total amount of the monomer composition M, it is apparent that during this particular stage(s) S, the concentration of polymerized monomers M2 in the polymers formed in this stage(s) S will be higher than the average concentration of polymerized monomers M2 in the polymer particles, thereby forming polymer populations within the polymer particles with a higher proportion of monomers M2 and, hence, increased concentration of carboxyl groups.

The level of monomers M2 added in said stage S may be as high as 100% by weight but will frequently not exceed 85% by weight, in particular 80% by weight, more particularly 75% by weight, especially 60% by weight or 50% by weight, in each case based on the total amount of monomers added in this stage. Frequently, the level of monomers M2 added in said stage S is from 6 to 85% by weight, in particular from 7 to 80% by weight, more particularly from 8 to 75% by weight, especially from 9 to 70% by weight or 10 to 50% by weight, in each case based on the total amount of monomers M added during this stage S.

In the other stage or stages, hereinafter termed stage(s) T, the level of monomers M2 added in said stage(s) T will consequently be lower than 5% by weight, in particular at most 4% by weight, more particularly at most 3% by weight, especially at most than 2.5% by weight and as low as 0% by weight, based on the total amount of monomers added during said other stage or stages T. In particular, the level of monomers added in said stage(s) T will in frequently be from 0 to <5% by weight, in particular from 0.05 to 4% by weight, more particularly from 0.1 to 3% by weight, especially from 0.2 to 2.5% by weight, based on the total amount of monomers added during said other stage or stages T.

Due to the particular inhomogeneous distribution of the monomers M2 within the particles of the polymer latex it has a characteristic swelling behavior in alkaline aqueous media, i.e. the polymer particles of the latex swell to a certain degree but do not dissolve in alkaline aqueous media. The degree of swelling can be determined by comparing the Z average particle diameter by light scattering at 20° C. (as described below) of a diluted latex sample at pH 8 and one at a pH 12, while ensuring an equal polymer concentration for the diluted samples at different pH, e.g. 0.01% by weight, and a concentration of a non-ionic emulsifier, e.g. an ethoxylated C16/C18 alkanol (degree of ethoxylation of 18) of 0.1% by weight. In other words, the degree of swelling is the ratio of the Z average particle diameter determined at pH 12 to the Z average particle diameter determined at pH 8.

The average particle diameter as referred herein relates to the Z average particle diameter as determined by means of photon correlation spectroscopy (PCS), also known as quasielastic light scattering (QELS) or dynamic light scattering (DLS). The measurement method is described in the ISO 13321:1996 standard. The determination can be carried out using an HPPS (High Performance Particle Sizer). For this purpose, a sample of the aqueous polymer latex will be diluted and the dilution will be analysed. In the context of DLS, the aqueous dilution may have a polymer concentration in the range from 0.001 to 0.5% by weight, depending on the particle size. For most purposes, a proper concentration will be 0.01% by weight. However, higher or lower concentrations may be used to achieve an optimum signal/noise ratio. The dilution can be achieved by addition of the polymer latex to water or an aqueous solution of a surfactant in order to avoid flocculation. Usually, dilution is performed by using a 0.1% by weight aqueous solution of a non-ionic emulsifier, e.g. an ethoxylated C16/C18 alkanol (degree of ethoxylation of 18), as a diluent. Measurement configuration: HPPS from Malvern, automated, with continuous-flow cuvette and Gilson autosampler. Parameters: measurement temperature 20.0° C.; measurement time 120 seconds (6 cycles each of 20 s); scattering angle 173°; wavelength laser 633 nm (HeNe); refractive index of medium 1.332 (aqueous); viscosity 0.9546 mPa·s. The measurement gives an average value of the second order cumulant analysis (mean of fits), i.e. Z average. The "mean of fits" is an average, intensity-weighted hydrodynamic particle diameter in nm.

The degree of swelling, i.e. the ratio of the Z average particle diameter at pH 12 and 20° C. to the Z average particle diameter at pH 8 and 20° C., of the polymer latex will generally not exceed a value of 2.0. This swelling ratio is preferably at least 1.1 (swelling of 10%). In particular the swelling degree is in the range of 1.2 to 1.8, especially in the range of 1.3 to 1.7, as determined by dynamic light scattering of a 0.001 to 0.5% by weight aqueous dilution of the latex at the respective pH.

The polymer particles of the aqueous polymer latex contained in the latex paint of the invention frequently have a Z average particle diameter of at most 500 nm, in particular of at most 300 nm, e.g. in the range from 50 to 500 nm, in particular in the range from 70 to 300 nm and especially in the range from 80 to 250 nm, as determined by dynamic light scattering of an aqueous dilution of the latex at pH 8 and 22° C.

According to the present invention, the monomers M1 are selected from $C_1$-$C_{20}$-alkyl esters of acrylic acid, $C_1$-$C_{20}$-alkylesters of methacrylic acid, and vinyl aromatic monomers.

Suitable $C_1$-$C_{20}$-alkyl esters of acrylic acid include but are not limited to methyl acrylate, ethyl acrylate, n-propyl acrylate, isopropyl-acrylate, n-butyl acrylate, 2-butyl acrylate, isobutyl acrylate, n-pentyl acrylate, n-hexyl acrylate, n-octyl acrylate, 2-ethylhexyl acrylate, n-decyl acrylate, 2-propylheptyl acrylate, lauryl acrylate, $C_{12}$/$C_{14}$-alkyl acrylate, and stearyl acrylate.

Suitable $C_1$-$C_{20}$-alkyl esters of methacrylic acid include but are not limited to $C_1$-$C_4$-alkyl esters of methacrylic acid, such as methyl methacrylate, ethyl methacrylate, n-propyl methacrylate, isopropyl methacrylate, n-butyl methacrylate, 2-butyl methacrylate, isobutyl methacrylate and tert.-butyl methacrylate; and $C_5$-$C_{20}$-alkylesters of methacrylic acid, such as n-pentyl methacrylate, n-hexyl methacrylate, n-octyl methacrylate, 2-ethylhexyl methacrylate, n-decyl methacrylate, 2-propylheptyl methacrylate, lauryl methacrylate, $C_{12}$/$C_{14}$-alkyl methacrylate, and stearyl methacrylate;

and mixtures thereof.

Suitable vinylaromatic monomers include but are not limited to mono-vinyl substituted aromatic hydrocarbons such as styrene, 2-methylstyrene, 4-methylstyrene, 2-n-butylstyrene, 4-n-butylstyrene, 4-n-decylstyrene and α-methylstyrene, with particular preference given to styrene Preferably, monomers M1 are selected from the group consisting of
- $C_2$-$C_{10}$-alkyl esters of acrylic acid, in particular ethyl acrylate, n-butyl acrylate, n-hexyl acrylate, n-octyl acrylate, 2-ethylhexyl acrylate, 2-propylheptyl acrylate and mixtures thereof, e.g. mixtures of n-butyl acrylate and 2-ethylhexylacrylate or mixtures of n-butyl acrylate and ethylacrylate or mixtures of ethyl acrylate, n-butyl acrylate and 2-ethylhexylacrylate;
- $C_1$-$C_4$-alkyl esters of methacrylic acid, in particular methyl methacrylate;
- vinylaromatic monomers, in particular mono-vinyl substituted aromatic hydrocarbons, especially styrene;

in particular mixtures thereof.

In particular, the monomers M1 are a mixture of
- at least one monomer M1a, selected from $C_1$-$C_{20}$-alkyl esters of acrylic acid and $C_5$-$C_{20}$-alkylesters of methacrylic acid and mixtures thereof; and
- at least one monomer M1b, selected from vinyl aromatic monomers, and $C_1$-$C_4$-alkyl esters of methacrylic acid and mixtures thereof.

More particularly, the monomers M1 are a mixture of
- at least one monomer M1a, selected from $C_2$-$C_{10}$-alkyl esters of acrylic acid, in particular from ethyl acrylate, n-butyl acrylate, n-hexyl acrylate, n-octyl acrylate, 2-ethylhexyl acrylate, 2-propylheptyl acrylate and mixtures thereof; and
- at least one monomer M1b, selected from vinyl aromatic monomers, and $C_1$-$C_4$-alkyl esters of methacrylic acid and mixtures thereof.

Especially, the monomers M1 are a mixture of
- at least one monomer M1a, selected from $C_2$-$C_{10}$-alkyl esters of acrylic acid; and
- at least one monomer M1b, selected from styrene and methyl methacrylate and mixtures thereof.

In the mixtures of monomers M1a and M1b, the relative amount of M1a and M1b may vary in particular from 10:1 to 1:10, more particularly from 5:1 to 1:5, especially from 3:1 to 1:3.

The total amount of monomers M1 is frequently from 80 to 99.95% by weight, in particular from 80 to 99.8% by weight and especially from 80 to 99.5% by weight, based on the total weight of the monomer composition M.

It has been found beneficial, if the monomer composition M contains at least one vinylaromatic monomer, in particular if it contains styrene.

The amount of vinylaromatic monomer, in particular styrene, may range from 1% by weight to 95%, in particular 2 to 85% by weight, based on the weight of the monomers M1. In particular groups of embodiments, the monomer composition contains from 10 to 90%, in particular 20 to 80% by weight, especially 30 to 75% by weight of a vinylaromatic monomer, in particular styrene, based on the total weight of the monomer composition M. If the monomers M1 are a mixture of at least one monomer M1a and at least one monomer M1b, the relative amount of vinylaromatic monomer, in particular styrene, is in particular at least 10% by weight, more particular at least 20% by weight especially at least 30% by weight or at least 50% by weight, based on the amount of the monomers M1b.

Suitable monomers M2 include, but are not limited to
- monoethylenically unsaturated monocarboxylic acids having 3 to 6 carbon atoms, such as acrylic acid, methacrylic acid, crotonic acid, 2-ethylpropenoic acid, 2-propylpropenoic acid, 2-acryloxyacetic acid and 2-methacryloxyacetic acid;
- monoethylenically unsaturated dicarboxylic acids having 4 to 6 carbon atoms, such as itaconic acid and fumaric acid.

Amongst the aforementioned monomers M2, preference is given to monocarboxylic acids. Particular preference is given to acrylic acid, methacrylic acid and mixtures thereof. In a particular group of embodiments, the monomer M2 comprises methacrylic acid. Especially, the monomer M2 is methacrylic acid or a mixture of acrylic acid and methacrylic acid.

The total amount of monomers M2 is generally from 0.05 to 5% by weight, in particular from 0.1 to 5% by weight, preferably from 0.2 to 5% by weight, especially from 0.5 to 4% by weight, based on the total weight of the monomer composition M. Consequently, the total amount of monomers M1+M3, if present, is generally from 95 to 99.95% by weight, in particular from 95 to 99.9% by weight, preferably from 95 to 99.8% by weight and especially from 96 to 99.5% by weight, based on the total weight of the monomer composition M.

Examples of monomers M3 include, but are not limited to
- primary amides of monoethylenically unsaturated monocarboxylic acids having 3 to 8 carbon atoms (monomers M3.1), such as acrylamide and methacrylamide;
- N—$C_1$-$C_{10}$ alkyl amides of monoethylenically unsaturated monocarboxylic acids having 3 to 6 carbon atoms (monomers M3.2), in particular N—$C_1$-$C_{10}$ alkyl amides of acrylic acid or methacrylic acid, such as N-methyl acrylamide, N-ethyl acrylamide, N-propyl acrylamide, N-isopropyl acrylamide, N-butyl acrylamide, N-methyl methacrylamide, N-ethyl methacrylamide, N-propyl methacrylamide, N-isopropyl methacrylamide and N-butyl methacrylamide;
- monoethylenically unsaturated monomers bearing urea or keto groups (Monomers M3.3), such as 2-(2-oxo-imidazolidin-1-yl)ethyl (meth)acrylate, 2-ureido (meth) acrylate, N-[2-(2-oxooxazolidin-3-yl)ethyl] methacrylate, acetoacetoxyethyl acrylate, acetoacetoxypropyl methacrylate, acetoacetoxybutyl methacrylate, 2-(acetoacetoxy)ethyl methacrylate, diacetoneacrylamide (DAAM) and diacetonemethacrylamide;
- hydroxyalkyl esters of monoethylenically unsaturated $C_3$-$C_6$ monocarboxylic acids (monomers M3.4), especially hydroxyalkyl esters of acrylic acid and hydroxyalkyl esters of methacrylic acid, also referred to hereinafter as hydroxyalkyl (meth)acrylates, in particular hydroxy-$C_2$-$C_4$-alkylesters of acrylic acid and hydroxy-$C_2$-$C_4$-alkylesters of methacrylic acid, such as 2-hydroxyethyl acrylate, 3-hydroxypropyl acrylate, 4-hydroxybutyl acrylate, 2-hydroxyethyl methacrylate, 3-hydroxypropyl methacrylate, 4-hydroxybutyl methacrylate, etc.
- monoethylenically unsaturated monomers which bear at least one tri-$C_1$-$C_4$-alkoxysilane group (monomers M3.5), such as vinyl trimethoxysilane, vinyl triethoxysilane, methacryloxyethyl trimethoxysilane, methacryloxyethyl triethoxysilane, and mixtures thereof. The amount of said monomers M3.5 will frequently be in the range from 0.01 to 1 pphm.

Monomers M3 may also include a small amount of multiethylenically unsaturated monomers (monomers M3.6), i.e. monomers having at least 2 non-conjugated ethylenically unsaturated double bounds. The amounts of said monomers M3.6 will generally not exceed 1 pphm.

Examples of suitable monomers M3.6 include:
- Diesters of monoethylenically unsaturated $C_3$-$C_6$ monocarboxylic acids with saturated aliphatic or cycloaliphatic diols, in particular diesters of acrylic acid or methacrylic acid, such as the diacrylates and the dimethacrylates of ethylene glycol (1,2-ethanediol), propylene glycol (1,2-propanediol), 1,2-butanediol, 1,3-butanediol, 1,4-butanediol, neopentyl glycol (2,2-dimethyl-1,3-propanediol) or 1,2-cyclohexanediol;

monoesters of monoethylenically unsaturated $C_3$-$C_6$ monocarboxylic acids with monoethylenically unsaturated aliphatic or cycloaliphatic monohydroxy compounds, such as the acrylates and the methacrylates of vinyl alcohol (ethenol), allyl alcohol (2-propen-1-ol), 2-cyclohexen-1-ol or norbornenol and divinyl aromatic compounds, such as 1,3-divinyl benzene, 1,4-divinyl benzene and mixtures thereof.

In a particular embodiment of the invention, the monomers M do not contain monomers M3.6 or not more than 0.1 pphm of monomers M3.6.

Amongst monomers M3, preference is given to hydroxyalkyl esters of acrylic acid and hydroxyalkyl esters of methacrylic acid, in particular to hydroxy-$C_2$-$C_4$-alkylesters of acrylic acid and hydroxy-$C_2$-$C_4$-alkylesters of methacrylic acid, acrylamide, methacrylamide and to mixtures thereof.

In a particular group of embodiments, the amount of monomers M3 is less than 10% by weight of the total weight of the monomer composition M, in particular less than 5% by weight, especially less than 3% by weight, based on the total weight of the monomer composition M. In this particular group of embodiments, the total amount of monomers M1 is frequently from 85 to 99.95% by weight, in particular from 90 to 99.8% by weight and especially from 93 to 99.5% by weight, based on the total weight of the monomer composition M.

In another particular group of embodiments, the amount of monomers M3 is from 0.1 to 19.95% by weight of the total weight of the monomer composition M, in particular from 1 to 19.8% by weight, especially from 5 to 19.5% by weight, based on the total weight of the monomer composition M. In this particular group of embodiments, the total amount of monomers M1 is frequently from 80 to 99.85% by weight, in particular from 80 to 98.8% by weight and especially from 80 to 94.5% by weight, based on the total weight of the monomer composition M.

It is apparent, that the average composition of the polymer particles of the polymer latex is essentially the same as the overall composition of the monomer composition M, i.e. the polymer latex contains the monomers M in polymerized form in the relative amounts given for the monomer composition M.

The polymer contained in the polymer latex usually shows a glass transition. For the purpose of the invention, the glass transition temperature is preferably in the range from −20° C. to +90° C., in particular from 0 to 85° C. and especially in the range from 10 to 85° C. The glass transition temperature refers to the glass transition temperature as determined by the DSC method (differential scanning calorimetry) according to DIN 53765:1994-03 or ISO 11357-2, midpoint temperature, at a heating rate of 20K/min and with sample preparation preferably to DIN EN ISO 16805:2005.

The glass transition temperature of the polymer latex particles is governed by the monomer composition and thus by composition of the monomers M to be polymerized. Therefore, by choosing proper amounts of monomers M1, M2 and M3 the glass transition temperature of the polymer can be adjusted. According to Fox (T. G. Fox, Bull. Am. Phys. Soc. 1956 [Ser. II] 1, page 123) and according to Ullmann's Encyclopädie der technischen Chemie [Ullmann's Encyclopedia of Industrial Chemistry] (vol. 19, page 18, 4th edition, Verlag Chemie, Weinheim, 1980), the following is a good approximation of the glass transition temperature of no more than lightly crosslinked copolymers:

$$1/Tg = x_1/Tg_1 + x_2/Tg_2 + \ldots x_n/Tg_n,$$

where $x_1, x_2, \ldots x_n$ are the mass fractions of the monomers 1, 2, ... n and $Tg_1, Tg_2, \ldots T_gn$ are the glass transition temperatures in degrees Kelvin of the polymers synthesized from only one of the monomers 1, 2, ... n at a time. The Tg values for the homopolymers of most monomers are known and listed, for example, in Ullmann's Encyclopedia of Industrial Chemistry, 5th ed., vol. A21, page 169, Verlag Chemie, Weinheim, 1992; further sources of glass transition temperatures of homopolymers are, for example, J. Brandrup, E. H. Immergut, Polymer Handbook, 1st Ed., J. Wiley, New York 1966, 2nd Ed. J. Wiley, New York 1975, and 3rd Ed. J. Wiley, New York 1989.

The preparation of the latex is achieved by a multistage aqueous radical emulsion polymerisation of the monomer composition M including at least one stage S, wherein the relative amount of monomers M2 added in this stage is at least 6% by weight, based on the total amount of monomers added in said stage, and at least one other stage T, where the relative amount of monomers M2 added in this stage is less than 5% by weight, based on the total amount of monomers, added in said stage. Consequently, the different stages S and T are realized by the addition of monomer compositions $M_S$ and $M_T$, respectively, to the polymerization reaction, which differ at least in the relative amounts of the monomers M2 contained in said compositions. It is apparent that the monomer composition $M_S$ is the monomer composition added in stage S while the monomer composition $M_T$ is the monomer composition added in stage T.

The multistage aqueous radical emulsion polymerisation can be achieved by analogy to well-known processes of multistage aqueous radical emulsion polymerisation technology.

For example, it is possible to perform the multistage aqueous emulsion polymerisation by a so-called batch process, where a first monomer composition $M_S(1)$ or $M_T(1)$ is added all at once to the reaction vessel and polymerized, then a second monomer composition $M_S(2)$ or $M_T(2)$ is added and polymerized, and so on, provided that at least one monomer composition is a monomer composition $M_S$, wherein the relative amount of monomers M2 contained in $M_S$ is at least 6% by weight, based on the total amount of monomers in the monomer composition $M_S$, while at least one other monomer composition is a monomer composition $M_T$, wherein the relative amount of monomers M2 contained in $M_T$ is less than 5% by weight, based on the total amount of monomers in the monomer composition.

Frequently, the multistage aqueous emulsion polymerisation is performed as a monomer feed process. In a monomer feed process at least 95% of the monomers composition M to be polymerised are metered during a period P to the polymerisation reaction under polymerisation conditions. Consequently, at least 95% of the monomer composition M to be polymerised are metered during a period P to the polymerisation reaction under polymerisation conditions, provided that during at least one period P(n) within said period P the relative amount of monomers M2, which are metered to the polymerisation reaction during the periods P(n), to the total amount of the monomers, which are metered to the polymerisation reaction during said period P(n), is increased from less than 0.05:1, or less than 5% by weight, respectively, to at least 0.06:1, or at least 6% by weight, respectively, and decreased to less than 0.05:1, or less than 5% by weight, respectively, at the end of each of said period(s) P(n). Therefore, it is apparent that each period P(n) within the period P corresponds to a stage S while each period outside the period(s) P(n) corresponds to a stage T.

During each of the periods P(n), the relative amount of monomers M2 to the total amount of monomers which are fed during that period is more than 1% by weight higher, in particular at least 2% by weight higher, especially at least 3% by weight higher than the level outside the periods. In particular, the level of monomers M2 fed during the periods P(n) is 2 to 85% by weight, in particular 3 to 80% by weight, more particularly 5 to 75 pphm, especially 7 to 70% by weight or 9 to 50% by weight higher than the average level of monomers M2, which is fed outside the periods P(n).

The level of monomers M2 within the periods P(n) will usually be in the range from 6% by weight to 85% by weight, in particular from 7% by weight to 80% by weight, more particularly from 8% by weight to 75% by weight, especially 9% by weight to 70% by weight or from 10 to 50% by weight.

The level of monomers M2 in the monomer composition M, which is fed outside the period(s) P(n), i.e. the level of monomers M2 before and after each period P(n), is less than 5% by weight, frequently at most 4% by weight, in particular at most 3% by weight, especially at most 2.5% by weight and may be even 0% by weight, based on the amount of monomers fed outside the period(s) P(n). The level of monomers M2 in the monomer composition M, which is fed outside the periods P(n), may e.g. be from 0 to <5% by weight, in particular from 0.05 to 4% by weight, more particularly from 0.1 to 3% by weight, especially from 0.2 to 2.5% by weight. The level of monomers M2 in the monomer composition M, which is fed outside the periods P(n), may be the same or it may slightly vary. The variation in the level of monomers M2 outside the periods P(n) will normally be not more than 1% by weight, in particular not more than 0.5% by weight.

The values given here refer to the average values during the periods P(n) and outside the periods P(n).

There may be a single period P(n), during which the weight level of monomers M2 is increased. However, there may also be more than one period P(n). The total number of periods P(n) is not particularly limited and may be as high as 20 or even higher. For practical reasons the total number of periods P(n) will generally not exceed 10 and in particular be from 1 to 6.

It is apparent that the period(s) P(n), where the level of the monomers M2 is increased, are completely within said period P. For the purpose of the invention it is beneficial that the first period P(n) will not start before at least 10% of the monomers M, in particular at least 15% of the monomers M, which are subjected to the multistage radical emulsion polymerization, have been metered into the polymerisation reaction. Likewise, it was found beneficial, when the last of the periods P(n) will end, when at most 90%, in particular at most 85% of the monomers M, which are subjected to the emulsion polymerization, have been metered into the polymerisation reaction. In other words, the last of the periods P(n) will preferably not end later than the point of time, when 90% or 85% of the monomers M, which are subjected to the emulsion polymerization, have been metered into the polymerisation reaction.

The level of monomers M2 in the monomer composition added to the polymerization reaction and likewise the weight ratio of the acidic monomers M2 to the total amount of the other monomers M1+M3 in the monomer composition M, which is metered into the polymerization reaction, can be manipulated by well-known measures. For example, it may be possible to use a single feed line for metering the monomers M into the polymerization reaction. By increasing the concentration of the monomers M2 in the single feed line of monomers M or by lowering the total concentrations of monomers M1+M3 or by both measures the level of the acidic monomers M2 can be increased and vice versa.

Frequently and mostly for practical reasons at least a portion of the monomers M2, e.g. at least 20%, in particular at least 30%, e.g. from 20 to 100% or from 30 to 100% of the monomers M2 contained in the monomer composition M, may be metered to the polymerisation reaction via a separate feed line into the polymerization reaction. Frequently this separate feed is metered in parallel to the feed of the monomers M1+M3 and optionally the remainder of the monomers M2. In other words, monomers M1+M3 and optionally a portion of monomers M2, e.g. up to 80% or up to 70% of the total amount of monomers M2, are metered into the polymerization reaction as a first feed while the remaining portion of monomers M2, e.g. from 20 to 100% or from 30 to 100% of the total amount of monomers M2, are metered into the polymerization reaction as a second feed. By increasing the feeding rate of the second feed or by lowering the feeding rate of the first feed or by both measures the weight ratio of monomers M2 to monomers M1+M3 can be easily increased. Mostly for practical reasons one may start the second feed at the beginning of each period P(n) and interrupt the addition of the second feed at the end of each period P(n), which means that the feed-rate of the second feed is different from 0 only during the period(s) P(n). The first feed and the second feed may also be mixed, e.g. in an in-line mixer or by means of a mixing pump, before the combined feed is fed to the polymerisation vessel.

It is apparent that the total duration of all periods P(n) is shorter than the duration of the period P required for the metering of the total amount of monomers M into the polymerization reaction. Frequently, the total duration of all periods P(n) does not exceed 50%, in particular 40% and especially 30% of the duration of period P. Frequently, the total duration of all periods P(n) is at least 0.2%, in particular at least 0.5% and especially at least 1% of the duration of period P. In particular, the ratio of the total duration of all periods P(n) to the duration of the period P is from 0.002:1 to 0.3:1, especially from 0.005:1 to 0.25:1. Frequently, the total duration of all periods P(n) is from 30 seconds to 60 minutes, especially from 1 to 45 minutes. The duration of an individual period P(n) is of minor importance may be some seconds, e.g. 10 seconds and be up to 30 minutes or higher. Frequently, the duration of an individual period P(n) is from 10 seconds to 45 minutes and in particular from 30 seconds to 40 minutes. The duration of a period P may depend from the production equipment and may vary from e.g. 20 minutes to 12 h. Frequently, it will be in the range from 0.5 h to 5 h, especially from 1 h to 4 h.

Frequently, the total amount of monomers M2 contained in the monomer composition M may be added during the at least one period P(n) to the polymerisation reaction. However, it is not necessary to add the total amount of monomers M2 during the at least one period P(n), i.e. during all of the periods P(n). Frequently, at least 20% of the monomers M2 contained in the monomer composition M, in particular at least 30% or at least 40% of the monomers M2 contained in the monomer composition M are metered into the polymerization reaction during the at least one period P(n).

The relative amount of monomers M2 added during all of periods P(n) to the polymerisation reaction may be from 0.05 to 5% by weight, based on the total weight of the monomer composition M. Frequently, it is from 0.1 to 3% by weight, in particular form 0.2 to 2% by weight, based on the total weight of the monomer composition M.

Apart from that, the process of the present invention is performed by analogy to well-known processes of radical emulsion polymerisation technology. The conditions required for the performance of the free-radical emulsion polymerization of the monomers M are sufficiently familiar to those skilled in the art, for example from the prior art cited at the outset and from "Emulsionspolymerisation" [Emulsion Polymerization] in Encyclopedia of Polymer Science and Engineering, vol. 8, pages 659 ff. (1987); D. C. Blackley, in High Polymer Latices, vol. 1, pages 35 ff. (1966); H. Warson, The Applications of Synthetic Resin Emulsions, chapter 5, pages 246 ff. (1972); D. Diederich, Chemie in unserer Zeit 24, pages 135 to 142 (1990); Emulsion Polymerisation, Interscience Publishers, New York (1965); DE-A 40 03 422 and Dispersionen synthetischer Hochpolymerer [Dispersions of Synthetic High Polymers], F. Hölscher, Springer-Verlag, Berlin (1969)].

The free-radically initiated aqueous emulsion polymerization is triggered by means of a free-radical polymerization initiator (free-radical initiator). These may in principle be peroxides or azo compounds. Of course, redox initiator systems are also useful. Peroxides used may, in principle, be inorganic peroxides, such as hydrogen peroxide or peroxodisulfates, such as the mono- or di-alkali metal or ammonium salts of peroxodisulfuric acid, for example the mono- and disodium, -potassium or ammonium salts, or organic peroxides such as alkyl hydroperoxides, for example tert-butyl hydroperoxide, p-menthyl hydroperoxide or cumyl hydroperoxide, and also dialkyl or diaryl peroxides, such as di-tert-butyl or di-cumyl peroxide. Azo compounds used are essentially 2,2'-azobis(isobutyronitrile), 2,2'-azobis(2,4-dimethylvaleronitrile) and 2,2'-azobis(amidinopropyl) dihydrochloride (AIBA, corresponds to V-50 from Wako Chemicals). Suitable oxidizing agents for redox initiator systems are essentially the peroxides specified above. Corresponding reducing agents which may be used are sulfur compounds with a low oxidation state, such as alkali metal sulfites, for example potassium and/or sodium sulfite, alkali metal hydrogensulfites, for example potassium and/or sodium hydrogensulfite, alkali metal metabisulfites, for example potassium and/or sodium metabisulfite, formaldehydesulfoxylates, for example potassium and/or sodium formaldehydesulfoxylate, alkali metal salts, specifically potassium and/or sodium salts of aliphatic sulfinic acids and alkali metal hydrogensulfides, for example potassium and/or sodium hydrogensulfide, salts of polyvalent metals, such as iron(II) sulfate, iron(II) ammonium sulfate, iron(II) phosphate, ene diols, such as dihydroxymaleic acid, benzoin and/or ascorbic acid, and reducing saccharides, such as sorbose, glucose, fructose and/or dihydroxyacetone.

Preferred free-radical initiators are inorganic peroxides, especially peroxodisulfates, and redox initiator systems.

In general, the amount of the free-radical initiator used, based on the total amount of monomers M, is 0.01 pphm to 5 pphm, preferably 0.1 pphm to 3 pphm.

The amount of free-radical initiator required in the process of the invention for the emulsion polymerization M can be initially charged in the polymerization vessel completely. However, it is also possible to charge none of or merely a portion of the free-radical initiator, e.g. not more than 30% by weight, especially not more than 20% by weight, based on the total amount of the free-radical initiator required in the aqueous polymerization medium and then, under polymerization conditions, during the free-radical emulsion polymerization of the monomers M to add the entire amount or any remaining residual amount, according to the consumption, batch wise in one or more portions or continuously with constant or varying flow rates.

More particularly, it has been found to be suitable to establish the polymerization conditions and to initially charge at least a portion of the free-radical initiator into the polymerisation vessel bevor the metering of the monomers M is started.

It has been found advantageous to perform the free-radical emulsion polymerization in the presence of a seed latex. A seed latex is a polymer latex which is present in the aqueous polymerization medium before the metering of the monomers M is started. The seed latex may help to better adjust the particle size or the final polymer latex obtained in the free-radical emulsion polymerization of the invention.

Principally every polymer latex may serve as a seed latex. For the purpose of the invention, preference is given to seed latices, where the particle size of the polymer particles is comparatively small. In particular, the Z average particle diameter of the polymer particles of the seed latex, as determined by dynamic light scattering at 20° C. (see below) is preferably in the range from 10 to 80 nm, in particular form 10 to 50 nm. Preferably, the polymer particles of the seed latex is made of ethylenically unsaturated monomers, which comprise at least 95% by weight, based on the total weight of the monomers forming the seed latex, of one or more monomers M1 as defined above. In the polymer particles of the seed latex particular comprise at least 95% by weight, based on the total weight of the monomers forming the seed latex, of at least one monomer M1b or of a mixture of at least one monomer M1b and one or more monomers M1a, where the proportion of monomers M1b to M1a is at least 50% on a weight basis.

For this, the seed latex is usually charged into the polymerisation vessel bevor the metering of the monomers M is started. In particular, the seed latex is charged into the polymerisation vessel followed by establishing the polymerization conditions and charging at least a portion of the free-radical initiator into the polymerisation vessel bevor the metering of the monomers M is started.

The amount of seed latex, calculated as solids, may frequently be in the range from 0.1 to 10% by weight, in particular from 0.5 to 5% by weight, based on the total weight of the monomers M to be polymerized.

The free-radical aqueous emulsion polymerization of the invention can be conducted at temperatures in the range from 0 to 170° C. Temperatures employed are generally in the range from 50 to 120° C., frequently 60 to 120° C. and often 70 to 110° C. The free-radical aqueous emulsion polymerization of the invention can be conducted at a pressure of less than, equal to or greater than 1 atm (atmospheric pressure), and so the polymerization temperature may exceed 100° C. and may be up to 170° C. Polymerization of the monomers is normally performed at ambient pressure but it may also be performed under elevated pressure. In this case, the pressure may assume values of 1.2, 1.5, 2, 5, 10, 15 bar (absolute) or even higher values. If emulsion polymerizations are conducted under reduced pressure, pressures of 950 mbar, frequently of 900 mbar and often 850 mbar (absolute) are established. Advantageously, the free-radical aqueous emulsion polymerization of the invention is conducted at ambient pressure (about 1 atm)

with exclusion of oxygen, for example under an inert gas atmosphere, for example under nitrogen or argon.

The polymerization of the monomers M can optionally be conducted in the presence of chain transfer agents. Chain transfer agents are understood to mean compounds that transfer free radicals and which reduce the molecular weight of the or control chain growth in the polymerization. Examples of chain transfer agents are aliphatic and/or araliphatic halogen compounds, for example n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide, organic thio compounds such as primary, secondary or tertiary aliphatic thiols, for example ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and the isomeric compounds thereof, n-octanethiol and the isomeric compounds thereof, n-nonanethiol and the isomeric compounds thereof, n-decanethiol and the isomeric compounds thereof, n-undecanethiol and the isomeric compounds thereof, n-dodecanethiol and the isomeric compounds thereof, n-tridecanethiol and isomeric compounds thereof, substituted thiols, for example 2-hydroxyethanethiol, aromatic thiols such as benzenethiol, ortho-, meta- or para-methylbenzenethiol, alkylesters of mercaptoacetic acid (thioglycolic acid) such as 2-ethylhexyl thioglycolate, alkylesters of mercaptopropionic acid such as octyl mercapto propionate, and also further sulfur compounds described in Polymer Handbook, 3rd edition, 1989, J. Brandrup and E.H. Immergut, John Wiley & Sons, section II, pages 133 to 141, but also aliphatic and/or aromatic aldehydes such as acetaldehyde, propionaldehyde and/or benzaldehyde, unsaturated fatty acids such as oleic acid, dienes having nonconjugated double bonds, such as divinylmethane or vinylcyclohexane, or hydrocarbons having readily abstractable hydrogen atoms, for example toluene. Alternatively, it is possible to use mixtures of the aforementioned chain transfer agents that do not disrupt one another. The total amount of chain transfer agents optionally used in the process of the invention, based on the total amount of monomers M, will generally not exceed 1% by weight.

The free-radical emulsion polymerization of the invention is usually performed in an aqueous polymerization medium, which, as well as water, comprises at least one surface-active substance (surfactant) for stabilizing the emulsion of the monomers and the polymer particles of the polymer latex.

The surfactant may be selected from emulsifiers and protective colloids. Protective colloids, as opposed to emulsifiers, are understood to mean polymeric compounds having molecular weights above 2000 Daltons, whereas emulsifiers typically have lower molecular weights. The surfactants may be anionic or nonionic or mixtures of non-ionic and anionic surfactants.

Anionic surfactants usually bear at least one anionic group, which is selected from phosphate, phosphonate, sulfate and sulfonate groups. The anionic surfactants, which bear at least one anionic group, are typically used in the form of their alkali metal salts, especially of their sodium salts or in the form of their ammonium salts.

Preferred anionic surfactants are anionic emulsifiers, in particular those, which bear at least one sulfate or sulfonate group. Likewise, anionic emulsifiers, which bear at least one phosphate or phosphonate group may be used, either as sole anionic emulsifiers or in combination with one or more anionic emulsifiers, which bear at least one sulfate or sulfonate group.

Examples of anionic emulsifies, which bear at least one sulfate or sulfonate group, are, for example,
- the salts, especially the alkali metal and ammonium salts, of alkyl sulfates, especially of $C_8$-$C_{22}$-alkyl sulfates,
- the salts, especially the alkali metal and ammonium salts, of sulfuric monoesters of ethoxylated alkanols, especially of sulfuric monoesters of ethoxylated $C_8$-$C_{22}$-alkanols, preferably having an ethoxylation level (EO level) in the range from 2 to 40,
- the salts, especially the alkali metal and ammonium salts, of sulfuric monoesters of ethoxylated alkylphenols, especially of sulfuric monoesters of ethoxylated $C_4$-$C_{18}$-alkylphenols (EO level preferably 3 to 40),
- the salts, especially the alkali metal and ammonium salts, of alkylsulfonic acids, especially of $C_8$-$C_{22}$-alkylsulfonic acids,
- the salts, especially the alkali metal and ammonium salts, of dialkyl esters, especially di-$C_4$-$C_{18}$-alkyl esters of sulfosuccinic acid,
- the salts, especially the alkali metal and ammonium salts, of alkylbenzenesulfonic acids, especially of $C_4$-$C_{22}$-alkylbenzenesulfonic acids, and
- the salts, especially the alkali metal and ammonium salts, of mono- or disulfonated, alkyl-substituted diphenyl ethers, for example of bis(phenylsulfonic acid) ethers bearing a $C_4$-$C_{24}$-alkyl group on one or both aromatic rings. The latter are common knowledge, for example from U.S. Pat. No. 4,269,749, and are commercially available, for example as Dowfax® 2A1 (Dow Chemical Company).

Also suitable are mixtures of the aforementioned salts.

Preferred anionic surfactants are anionic emulsifiers, which are selected from the following groups:
- the salts, especially the alkali metal and ammonium salts, of alkyl sulfates, especially of $C_8$-$C_{22}$-alkyl sulfates,
- the salts, especially the alkali metal salts, of sulfuric monoesters of ethoxylated alkanols, especially of sulfuric monoesters of ethoxylated $C_8$-$C_{22}$-alkanols, preferably having an ethoxylation level (EO level) in the range from 2 to 40,
- of sulfuric monoesters of ethoxylated alkylphenols, especially of sulfuric monoesters of ethoxylated $C_4$-$C_{18}$-alkylphenols (EO level preferably 3 to 40),
- of alkylbenzenesulfonic acids, especially of $C_4$-$C_{22}$-alkylbenzenesulfonic acids, and
- of mono- or disulfonated, alkyl-substituted diphenyl ethers, for example of bis(phenylsulfonic acid) ethers bearing a $C_4$-$C_{24}$-alkyl group on one or both aromatic rings.

Examples of anionic emulsifies, which bear a phosphate or phosphonate group, include, but are not limited to the following salts are selected from the following groups:
- the salts, especially the alkali metal and ammonium salts, of mono- and dialkyl phosphates, especially $C_8$-$C_{22}$-alkyl phosphates,
- the salts, especially the alkali metal and ammonium salts, of phosphoric monoesters of $C_2$-$C_3$-alkoxylated alkanols, preferably having an alkoxylation level in the range from 2 to 40, especially in the range from 3 to 30, for example phosphoric monoesters of ethoxylated $C_8$-$C_{22}$-alkanols, preferably having an ethoxylation level (EO level) in the range from 2 to 40, phosphoric monoesters of propoxylated $C_8$-$C_{22}$-alkanols, preferably having a propoxylation level (PO level) in the range from 2 to 40, and phosphoric monoesters of ethoxylated-co-propoxylated $C_8$-$C_{22}$-alkanols, preferably having an ethoxylation level (EO level) in the range from 1 to 20 and a propoxylation level of 1 to 20, the salts, especially the alkali metal and ammonium salts, of phosphoric monoesters of ethoxylated alkylphenols, especially phosphoric monoesters of ethoxylated $C_4$-$C_{18}$-alkylphenols (EO level preferably 3 to 40), the salts, especially the alkali metal and ammonium salts, of alkylphosphonic acids, especially $C_8$-$C_{22}$-alkylphosphonic acids and the salts, especially the alkali metal and ammonium salts, of alkylbenzenephosphonic acids, especially $C_4$-$C_{22}$-alkylbenzenephosphonic acids.

Further suitable anionic surfactants can be found in Houben-Weyl, Methoden der organischen Chemie [Methods of Organic Chemistry], volume XIV/1, Makromolekulare Stoffe [Macromolecular Substances], Georg-Thieme-Verlag, Stuttgart, 1961, p. 192-208.

Preferably, the surfactant comprises at least one anionic emulsifier, which bears at least one sulfate or sulfonate group. The at least one anionic emulsifier, which bears at least one sulfate or sulfonate group, may be the sole type of anionic emulsifiers. However, mixtures of at least one anionic emulsifier, which bears at least one sulfate or sulfonate group, and at least one anionic emulsifier, which bears at least one phosphate or phosphonate group, may also be used. In such mixtures, the amount of the at least one anionic emulsifier, which bears at least one sulfate or sulfonate group, is preferably at least 50% by weight, based on the total weight of anionic surfactants used in the process of the present invention. In particular, the amount of anionic emulsifiers, which bear at least one phosphate or phosphonate group does not exceed 20% by weight, based on the total weight of anionic surfactants used in the process of the present invention.

As well as the aforementioned anionic surfactants, the surfactant may also comprise one or more nonionic surface-active substances, which are especially selected from nonionic emulsifiers. Suitable nonionic emulsifiers are e.g. araliphatic or aliphatic nonionic emulsifiers, for example ethoxylated mono-, di- and trialkylphenols (EO level: 3 to 50, alkyl radical: $C_4$-$C_{10}$), ethoxylates of long-chain alcohols (EO level: 3 to 100, alkyl radical: $C_8$-$C_{36}$), and polyethylene oxide/polypropylene oxide homo- and copolymers. These may comprise the alkylene oxide units copolymerized in random distribution or in the form of blocks. Very suitable examples are the EO/PO block copolymers. Preference is given to ethoxylates of long-chain alkanols (alkyl radical $C_1$-$C_{30}$, mean ethoxylation level 5 to 100) and, among these, particular preference to those having a linear $C_{12}$-$C_{20}$ alkyl radical and a mean ethoxylation level of 10 to 50, and also to ethoxylated monoalkylphenols.

In a particular embodiment of the invention, the surfactants used in the process of the present invention comprise less than 20% by weight, especially not more than 10% by weight, of nonionic surfactants, based on the total amount of surfactants used in the process of the present invention, and especially do not comprise any nonionic surfactant. In another embodiment of the invention, the surfactants used in the process of the present invention comprise at least one anionic surfactant and at least one non-ionic surfactant, the ratio of anionic surfactants to non-ionic surfactants being usually in the range form 0.5:1 to 10:1, in particular from 1:1 to 5:1.

Preferably, the surfactant will be used in such an amount that the amount of surfactant is in the range from 0.2% to 5% by weight, especially in the range from 0.5% to 3% by weight, based on the monomers M to be polymerized.

The aqueous reaction medium in the emulsion polymerization may in principle also comprise minor amounts 5% by weight) of water-soluble organic solvents, for example methanol, ethanol, isopropanol, butanols, pentanols, but also acetone, etc. Preferably, however, the process of the invention is conducted in the absence of such solvents.

It is frequently advantageous when the aqueous polymer dispersion obtained on completion of polymerization of the monomers M is subjected to a post-treatment to reduce the residual monomer content. This post-treatment is effected either chemically, for example by completing the polymerization reaction using a more effective free-radical initiator system (known as post-polymerization), and/or physically, for example by stripping the aqueous polymer dispersion with steam or inert gas. Corresponding chemical and physical methods are familiar to those skilled in the art—see, for example, EP-A 771328, DE-A 19624299, DE-A 19621027, DE-A 19741184, DE-A 19741187, DE-A 19805122, DE-A 19828183, DE-A 19839199, DE-A 19840586 and DE-A 19847115. The combination of chemical and physical post-treatment has the advantage that it removes not only the unconverted ethylenically unsaturated monomers but also other disruptive volatile organic constituents (VOCs) from the aqueous polymer dispersion.

The aqueous polymer latex which is used for preparing the latex paint will typically have polymer solids contents in the range from 10% to 70% by weight, frequently 20% to 65% by weight and often 30% to 60% by weight, based in each case on the total weight of the aqueous polymer latex.

Due to its specific polymer architecture, the polymer particles of polymer latex binder are capable of being adsorbed to the surface of titanium dioxide particles, even in the presence of a polymeric dispersant and the associative thickener(s), thereby spontaneously forming a particulate polymer composite material with titanium dioxide pigment particles. These particles are dispersed in the aqueous phase of the latex paint and thus form an aqueous dispersion containing polymer composite particles of titanium dioxide particles and polymer particles of the aqueous polymer latex as described herein. The composite particles ensure that the pigment particles are better separated from each other and more evenly distributed in the dried coating and thereby improve the hiding power/opacifying efficiency of the latex paint.

For example, in a mixture of the titanium dioxide pigment and the aqueous polymer latex, where the mass ratio of polymer latex, calculated as solids, and titanium dioxide is in the range from 0.1:1 to 5:1, in particular in the range from 0.3:1 to 1:3, the mixture having a solids content in the range from 10 to 70% by weight, and wherein the amount of the polymeric dispersant PD is 0.15 to 0.75 by weight of, based on the total weight of the titanium dioxide contained in the mixture, at least 30% by weight of the polymer latex particles, in particular at least 50% by weight of the polymer latex particles will be absorbed to the titanium dioxide particles and form composite particles, as can be determined e.g. by ultracentrifugation at 22° C. and pH 8.5.

In the aqueous latex paints (or aqueous coating compositions or water borne paints, respectively) the polymer latex may act as the sole binder or as co-binder, i.e. the polymer latex may provide the sole binding polymer in the coating composition or the coating composition may contain one or more further polymers, which act as a binder, i.e. polymers, which are conventionally used as binders in aqueous latex paints. Conventional binders may be any binders, which are conventionally used in aqueous coating compositions. Suitable binders include but are not limited to polymer latices, in particular polymer latices based on the aforementioned monomers M1, in particular styrene-acrylic latices and all-acrylic latices, latices based on vinyl acetate, polyurethane dispersions, polyester dispersions, and the like. Suitable binders may also be acid curable binders such as aldehyde binders, e.g. the Laropal® grades of BASF SE and amino resins, in particular etherified melamine formaldehyde binders, such as the Luwipal® grades of BASF, etherified urea formaldehyde binders, such as the Plastopal® grades of BASF, thermally curable binders, e.g. binders having blocked isocyanate groups, carbodiimide groups and/or epoxide groups, or aqueous UV curable binders. The type of binder will essentially depend on the intended use and a skilled person will readily appreciate which conventional binder can be used to achieve the desired purpose. In preferred embodiments of the invention, the relative amount of conventional binders will not exceed 50% by weight, in particular 20% by weight, especially 10% by weight, based on the total weight of the carboxylated polymer latex of the invention, calculated as polymer, and the conventional binder. In particular, the carboxylated polymer latex of the invention will be the sole binder.

The aqueous latex paint further contains a titanium dioxide pigment. The relative amount of pigment and latex in the latex paint will principally depend on the type of latex paint, i.e. whether it is a high gloss, semi-gloss or matting paint and also whether it is for interior use or exterior use. In the latex paint of the invention, the ratio of polymer latex, calculated as solids (i.e. the amount of polymer in the latex) to titanium dioxide is frequently in the range from 0.1:1 to 5:1, in particular from 0.2:1 to 4:1 and especially from 0.3:1 to 3:1 or from 0.5:1 to 3:1.

The titanium dioxide pigment used for preparing the aqueous dispersion of the polymer composite may be any $TiO_2$ pigment conventionally used in coating compositions, in particular in aqueous coating compositions. Frequently, a $TiO_2$ pigment is used wherein the $TiO_2$ particles in the rutile form.

In addition to the titanium dioxide pigment, the aqueous latex paint may contain one or more pigments different from the $TiO_2$ pigment. In addition to the titanium dioxide pigment, the aqueous latex paint may also contain one or more fillers or a combination of filler and one or more pigments different from the $TiO_2$ pigment. In particular groups of embodiments, the latex paints contain the $TiO_2$ pigment as essentially the sole pigment, i.e. the amount of pigments, which are different from the $TiO_2$ pigment will not exceed 20% by weight, based on the total amount of pigment, and may be as low as 0% by weight.

Suitable pigments different from the $TiO_2$ pigment are, for example, inorganic white pigments such as barium sulfate, zinc oxide, zinc sulfide, basic lead carbonate, antimony trioxide, lithopone (zinc sulfide+barium sulfate), or colored pigments, for example iron oxides, carbon black, graphite, zinc yellow, zinc green, ultramarine, manganese black, antimony black, manganese violet, Prussian blue or Paris green. In addition to the inorganic pigments, the emulsion paints of the invention may also comprise organic color pigments, for example sepia, gamboge, Cassel brown, toluidine red, para red, Hansa yellow, indigo, azo dyes, anthraquinonoid and indigoid dyes, and also dioxazine, quinacridone pigments, phthalocyanine pigments, isoindolinone pigments and metal complex pigments. Also suitable are synthetic white pigments with air inclusions to enhance light scattering, such as the Ropaque® and AQACell® dispersions. Additionally suitable are the Luconyl® brands from BASF SE, for example Luconyl® yellow, Luconyl® brown and Luconyl® red.

If the latex paint contains a filler, the weight ratio of filler to titanium dioxide will frequently not exceed 2:1. Frequently, the weight ratio of filler to titanium dioxide will be in the range from 0:1 to 2:1, in particular in the range form 0.1:1 to 1.5:1.

Examples of suitable fillers are aluminosilicates such as feldspars, silicates such as kaolin, talc, mica, magnesite, alkaline earth metal carbonates such as calcium carbonate, for example in the form of calcite or chalk, magnesium carbonate, dolomite, alkaline earth metal sulfates such as calcium sulfate, silicon dioxide, etc. In the coating compositions of the invention, finely divided fillers are naturally preferred. The fillers may be used in the form of individual components. In practice, however, filler mixtures have been found to be particularly useful, for example calcium carbonate/kaolin, calcium carbonate/talc. Gloss paints generally comprise only small amounts of very finely divided fillers, or do not comprise any fillers. Fillers also include flatting agents which significantly impair the gloss as desired. Flatting agents are generally transparent and may be either organic or inorganic. Examples of flatting agents are inorganic silicates, for example the Syloid® brands from W. R. Grace & Company and the Acematt® brands from Evonik GmbH. Organic flatting agents are obtainable, for example, from BYK-Chemie GmbH under the Ceraflour® brands and the Ceramat® brands, and from Deuteron GmbH under the Deuteron MK® brand.

The proportion of the pigments and fillers in the latex paint can be described in a manner known per se via the pigment volume concentration (PVC). The PVC describes the ratio of the volume of pigments ($V_P$) and fillers ($V_F$) relative to the total volume, consisting of the volumes of binder ($V_B$), pigments ($V_P$) and fillers ($V_F$) in a dried coating film in percent: $PVC=(V_P+V_F)\times 100/(V_P+V_F+V_B)$.

The inventive effects of the latex paints are especially manifested in the case of latex paints having a PVC of at least 5, especially at least 10. Frequently, the PVC of the latex paint will not exceed a value of 60, in particular 45 and especially 30, and is specifically in the range from 5 to 60 or 5 to 45 or 5 to 30 or 10 to 60 or 10 to 45 or 10 to 30.

In particular groups of embodiments of the invention, the latex paints contain titanium dioxide, preferably in the rutile form, in combination with one or more fillers, for example chalk, talc or mixtures thereof. In these groups of embodiments the weight ratio of filler to titanium dioxide will be frequently in the range from 0.1:1 to 2:1, in particular in the range form 0.1:1 to 1.5:1.

The latex paints of the invention contain at least one dispersant PD, which is a homo- or copolymer of one or more ethylenically unsaturated monomers M' which comprise at least one carboxyl-group containing monoethylenically unsaturated monomer M4, where the monomers M4 make up at least 85 mol-%, in particular at least 90 mol-%, especially at least 95 mol-% of the monomers M', which form the polymer dispersant PD. Especially, the polymeric dispersant is exclusively formed from monomers M4.

Suitable monomers M4 include, but are not limited to
monoethylenically unsaturated monocarboxylic acids having 3 to 6 carbon atoms, such as acrylic acid, methacrylic acid, crotonic acid, 2-ethylpropenoic acid, 2-propylpropenoic acid, 2-acryloxyacetic acid and 2-methacryloxyacetic acid;

monoethylenically unsaturated dicarboxylic acids having 4 to 6 carbon atoms, such as itaconic acid, citraconic acid, maleic acid and fumaric acid.

Amongst the aforementioned monomers M4, preference is given to monocarboxylic acids. Particular preference is given to acrylic acid, methacrylic acid, maleic acid and mixtures thereof. In particular, the monomer M4 comprises acrylic acid. More particularly, the monomer M4 is acrylic acid or a mixture of acrylic acid and methacrylic acid or a mixture of acrylic acid and maleic acid. Especially, the monomers forming the polymeric dispersant PD comprise at least 85 mol-%, in particular at least 90 mol-% or especially at least 95 mol-% or up to 100 mol-% of acrylic acid, based on the total amount of the monomers, which form the polymeric dispersant PD.

The monomers M' may comprise one or more further co-monomers M5, which are different from the monomers M4, as long as their amount does not exceed 15% by weight, based on the total amount of monomers M'. Suitable co-monomers M5 are the monomers M1 and M3 defined above. Preferably, the co-monomers M5 do not contain a monomer of type M3.6. In particular, the monomers M' forming the polymeric dispersant PD do not contain monomers having an anionic group different from a carboxylate group, such as sulfonate, phosphate or phosphonate group.

The polymeric dispersant is frequently used as a salt, where at least a part of the carboxyl groups of the polymerized monomers M4 are present in the neutralized anionic carboxylate form. Suitable counterions for neutralization are alkalimetal cations and ammonium ions, in particular $Na^+$, $K^+$ and $NH_4^+$. Preferably, the degree of neutralization is at least 50%, in particular at least 90%, i.e. at least 50%, in particular at least 90% of the carboxyl groups are present in the anionic carboxylate form.

The polymeric dispersant PD will frequently have a number average weight $M_n$ in the range from 500 to 10000 g/mol, as determined by gel permeation chromatography (GPC). Preferably, the number average molecular weight will not exceed 6000 g/mol, in particular not exceed 5000 g/mol, preferably not exceed 4000 g/mol and especially not exceed 3000 g/mol as determined by gel permeation chromatography (GPC). The number average molecular weight $M_n$ of the polymeric dispersant PD will usually be at least 500 g/mol, in particular at least 700 g/mol and especially at least 800 g/mol as determined by GPC. The number average weight $M_n$ is in particular in the range from 500 to 5000 g/mol, more particularly in the range from 700 to 4000 g/mol and especially in the range form 800 to 3000 g/mol as determined by GPC. Preferably, the weight average molecular weight $M_w$ will not exceed 20000 g/mol, in particular not exceed 15000 g/mol and is especially in the range from 600 to 15000 g/mol and especially in the range from 900 to 10000 g/mol. The polydispersity, i.e. the ratio $M_w/M_n$ is in the range from 1.2 to 6, especially in the range from 1.5 to 4.5.

The GPC can be performed by analogy to well-known methods. Frequently, the GPC for these types of polymers will be performed with 0.15% by weight solutions of the respective dispersant PD, using 0.01 mol/L aqueous phosphate buffer at pH 7.4, containing 0.01 mol/L $NaN_3$ as eluent and hydroxylated polymethacrylate gel as stationary phase. Sodium salt of polyacrylic acids having defined molecular weights will be used as reference materials for calibration. The determination of the molecular weight can be performed by analogy to DIN 55672-3:2016-03 using of polyacrylic acid (as sodium salts) as reference material for calibration.

In the latex paints of the invention, the dispersant PD may be the sole dispersant or essentially the sole dispersant. However, the latex paint may also contain one or more dispersants, which are different from the dispersant PD. However, the amount of dispersant, which is different from the dispersant PD, does generally not significantly exceed the amount of dispersant PD. In particular groups of embodiments, the amount of dispersant, which is different from the dispersant PD, will not exceed 20% by weight, based on the total amount of dispersant. Especially, the amount of dispersant, which is different from the dispersant PD, will not exceed 10% by weight, based on the total amount of dispersant, and may be as low as 0% by weight. On the other hand, dispersants, which are different from the dispersant PD may be present, e.g. in amounts up to 60% by weight, in particular up to 50% by weight, based on the total amount of dispersant. Other dispersants, which are different from the dispersant PD are those described in the prior art cited herein as well as copolymers of maleic acid and diisobutylene, copolymers of maleic acid and styrene, copolymers of acrylic acid and/or methacrylic acid with $C_1$-$C_6$-alkyl acrylates and/or $C_1$-$C_6$-alkyl acrylates, and in particular those water soluble polymers, which are amphiphilic or which have a sulfonate group.

In the latex paint of the invention, the amount of polymeric dispersant PD is frequently at least 0.05% by weight, in particular at least 0.1% by weight or at least 0.15% by weight, based on the amount of titanium dioxide pigment contained in the latex paint and will generally not exceed 1.0% by weight, in particular 0.9% by weight and especially 0.8% by weight, based on the amount of titanium dioxide pigment. In particular, the amount of polymeric dispersant PD is in the range from 0.05 to 1% by weight, in particular from 0.1 to 0.9% by weight especially from 0.15 to 0.8% by weight, based on the amount of titanium dioxide pigment contained in the latex paint. If the latex paint contains a further pigment and/or a filler, the amount of polymeric dispersant PD is frequently in the range from 0.05 to 1% by weight, in particular from 0.1 to 1% by weight especially from 0.15 to 0.9% by weight, based on the total amount of pigment and fillers.

The polymer dispersants PD are known or commercially available. They can be prepared by radical homo- or copolymerization of the monomers M4 or a salt thereof, optionally with one or more further comonomers M5. The molecular weight can be controlled e.g. by the amount of initiator, the presence or absence of chain regulating agents, the concentration of monomers and by the temperature and by combination of these measures.

The free-radically initiated polymerization is typically carried out in the presence of a polymerization initiator or a polymerization initiator system. Possible free-radical polymerization initiators are, in particular, initiators and initiator systems which form free radicals on decomposition. These include, in particular:

peroxo compounds, for example alkali metal or ammonium peroxodisulfates, diacetylperoxide, dibenzoyl peroxide, succinyl peroxide, di-tert-butyl peroxide, tert-butyl perbenzoate, tert-butyl perpivalate, tert-butyl peroxy-2-ethylhexanoate, tert-butyl permaleate, cumene hydroperoxide, diisopropyl peroxydicarbamate, tert-butyl perisobutyrate, tert-butyl peracetate, di-tert-amyl peroxide, tert-butyl hydroperoxide, azo compounds, such as 2,2'-azobisisobutyronitrile, azobis(2-amidinopropane) dihydrochloride, azobis(2,4-dimethylvaleronitrile) or 2,2'-azobis(2-methyl-butyronitrile);

initiator mixtures or redox initiator systems, such as ascorbic acid/iron(II) sulfate/sodium peroxodisulfate, tert-butyl hydroperoxide/sodium disulfite, tert-butyl hydroperoxide/sodium hydroxymethanesulfinate, $H_2O_2/Cu^I$.

The amount of polymerization initiator which is used for preparing the polymer dispersant PD is typically in the range from 0.4 to 6% by weight, in particular in the range from 0.5 to 5% by weight, based on the total amount of monomers M' to be polymerized. It is advantageous to add a portion of the polymerization initiator at the beginning of the polymerization reaction and to add the remainder during the polymerization over a prolonged period of time, for example in parallel with the addition of the monomers M'. The addition can be carried out at a continuous inflow rate or with an increasing or decreasing inflow rate.

The molecular weight of the polymers PD can be controlled by the amount of initiator, the polymerization temperature, the way how the initiator is introduced into the polymerization reaction, the type and amount of solvent used for the polymerization and the presence or absences of chain transfer agents.

Suitable chain transfer agents are, in particular, compounds having a thiol group, e.g. tert-butyl mercaptan, mercaptoethanol, mercaptopropanol, mercaptobutanol, thioglycolic acid, alkyl thioglycolates, such as ethyl thioglycolate, butyl thioglycolate or 2-ethylhexyl thioglycolate, mercaptopropionic acid, alkyl mercaptopropionate and tert-dodecyl mercaptan. Further suitable chain transfer agents are alkali metal phosphonates and hypophosphites. Organic solvents which have at least one OH group bound to an aliphatic carbon atom, for example $C_1$-$C_5$-alkanols, such as ethanol, isopropanol, 2-butanol or 2-pentanol, also act as chain transfer agents. The amount of chain transfer agent, if present, is e.g. in the range from 0.5 to 20% by weight, in particular in the range from 1 to 15% by weight, based on the total amount of the monomers M' to be polymerized. Organic solvents having OH groups, in particular secondary alcohols, can also be used in greater amounts since they have only a weak chain transfer action.

The homo- or copolymerization of the monomers of formula (I) and the one or more monomers M' can be carried out as a batch process or as a monomer feed stream process. In a monomer feed stream process the major part, preferably at least 80% and in particular at least 90% of the monomers M' to be polymerized are introduced into the polymerization reactor during the course of the polymerization under polymerization conditions. The introduction can be carried out continuously or stepwise. During the polymerization, the monomer composition can be altered once, a number of times or continuously (gradated mode of operation).

In the polymerization, the monomers M4 can be polymerized in their acidic form or as the salts thereof, preferably the alkalimetal salt or an ammonium salt. Frequently, the monomers M4 are polymerized in their acidic form and any neutralization will be performed after the polymerization.

The radical polymerization of the monomers M' may be carried out in bulk and preferably in a solvent. Preferably, the solvent increases the solubility of at least one of the monomers in the reaction medium. Examples include
water-miscible organic solvents are, for example, $C_1$-$C_5$-alkanols, e.g. methanol, ethanol, n-propanol, isopropanol, n-butanol, isobutanol, 2-butanol, tert-butanol, n-pentanol or 2-pentanol, glycols, such as ethylene glycol, diethylene glycol, and N-alkyl lactams such as N-methylpyrrolidone,
water, and
mixtures of water and one or more water-miscible organic solvents are, for example, mixtures of water and one or more $C_1$-$C_5$-alkanols.

The polymerization is typically carried out at temperatures in the range from 30 to 150° C., preferably in the range from 50 to 140° C. The polymerization pressure is usually in the region of atmospheric pressure, i.e. ambient pressure, but can also be slightly above or below this, e.g. in the range from 800 to 1800 mbar.

If the polymerization is performed in a reaction medium which contains an organic solvent, the organic solvent is preferably removed, e.g. by distillation, and optionally replaced by water.

Prior to their use, the thus obtained polymer solutions are preferably neutralized by addition of a base, e.g. an amine or ammonia or an alkalimetal base such as an alkalimetal hydroxide or an alkalimetal carbonate, e.g. NaOH or KOH. It is apparent that the base will provide the counter ions for the neutralized carboxyl groups.

As a further component, the latex paint of the invention contains at least one associative thickener polymer, also termed associative rheology modifier polymers or associative rheology modifiers, for adjusting the desired rheology profile of the latex paint, optionally in combination with one or more non-associative rheology modifiers. In contrast to the non-associative rheology modifiers the associative rheology modifiers interact by associative interaction of their hydrophobic moieties with the components of the latex paint, in particular with the polymer particles of the latex and also with the pigments, thereby forming a reversible dynamic network which imparts the particular rheological properties to the paint.

It is believed that this particular thickening mechanism of associative thickener polymers causes the detrimental effects of the thickener to the hiding/opacifying power and also may cause flocculation, because due to the interaction of the hydrophobic moieties associative thickener polymer with the polymer particles of the latex, the latex particles are desorbed from the titanium dioxide particles, which results in an aggregation of the titanium dioxide particles and consequently in reduced hiding power and possible flocculation.

The associative thickener polymer usually contains on average at least two hydrophobic moieties within one polymer molecule and one or more hydrophilic moieties which render them water soluble. The hydrophobic moieties may be arranged as side chains on a hydrophilic polymer backbone or they may form end-groups of a linear or branched polymer having an interior hydrophilic block, which may be interrupted by one or more hydrophobic blocks. The hydrophobic moieties are usually hydrocarbon radicals, which have at least 4 carbon atoms and which in particular have from 4 to 24 carbon atoms. Suitable hydrocarbon radicals include linear or branched alkyl radicals having from 4 to 24 carbon atoms, such as n-butyl, n-hexyl, n-octyl, isooctyl, 2-ethylhexyl, n-nonyl, isononyl, n-decyl, isodecyl, n-undecyl, isoundecyl, n-dodecyl, 2-butyloctyl, tridecyl, isotridecyl, myristyl, cetyl, stearyl, arachidyl, and oligomeric groups derived from polypropen, polybuten and polyisobuten. Suitable hydrocarbon radicals also include alkyl substituted phenyl radicals having from 4 to 24 carbon atoms, such as butylphenyl, hexylphenyl, octylphenyl, nonylphenyl, isononylphenyl, decylphenyl, isodecylphenyl, undecylphenyl, isoundecylphenyl, n-dodecylphenyl, tridecylphenyl, isotridecylphenyl, tetradecylphenyl, hexadecylphenyl and octadecylphenyl.

The associative thickener polymers include anionic, acrylate type thickener polymers, so-called HASE polymers (hydrophobically modified polyacrylate thickners), which are copolymers of acrylic acid and alkylacrylate monomers, where the alkyl group of the alkyl acrylate may have from 6 to 24 carbon atoms. The associative thickener polymers also include non-ionic associative thickeners, so called NiSAT thickeners (non-ionic synthetic associative thickeners), which usually are linear or branched block copolymers having at least one interior hydrophilic moiety, in particular a polyether moiety, especially at least one polyethylene oxide moiety and two or more terminal hydrocarbon groups each having at least 4 carbon atoms, in particular from 4 to 24 carbon atoms, e.g. a linear or branched alkyl radical having 4 to 24 carbon atoms or alkyl substituted phenyl having 7 to 24 carbon atoms.

Preferably, the associative thickener polymer is selected from NiSAT type associative thickeners, in particular from associative thickener polymers, which have at least one interior polyethylene oxide block and terminal hydrocarbon groups each having at least 4 carbon atoms, in particular from 4 to 24 carbon atoms, e.g. a linear or branched alkyl radical having 4 to 24 carbon atoms or alkyl substituted phenyl having 7 to 24 carbon atoms.

Particular embodiments of NiSAT type associative thickeners are the hydrophobically modified polyethylene oxide urethane rheology modifiers, also termed HEUR, and hydrophobically modified polyethyleneoxides, which are also termed HMPE. HMPE are characterized by having a central linear or branched polyethylene oxide radical, which at its termini bears hydrophobic groups, in particular terminal hydrocarbon groups as defined above, which are ether directly bound or via a linker. Suitable HMPE can be described by the formula (I) below. HEUR are characterized by having at least one polyethylene oxide block, at least two hydrophobic radicals and one ore more carbamate groups resulting from the reaction of an OH-functional monomer, e.g. the polyethyleneoxide a hydrophobically modified polyethyleneoxide or a hydrophobic alcohol with a di- or polyisocyanate. Suitable types of HEUR associative thickeners can be described by the following formulae (II) and (III).

Formula (I):

where k is 1 to 5, in particular 1 or 2, especially 1;
Peg$^1$ is a linear polyethyleneoxide block having 2 terminal oxygen atoms, which are linked to X;
A is a chemical bond, O, a radical O—R$^A$—O or a linear poly-C$_2$-C$_3$-alkyleneoxide block having two terminal oxygen atoms, where R$^A$ is C$_4$-C$_6$-alkandiyl or 2-hydroxypropan-1,3-diyl;
X is a k+1 valent linker, in particular a 2 valent linker (k=1), it being also possible for k=1 that X-A represents a single bond;
R$^1$ is a linear or branched alkyl radical having 4 to 24 carbon atoms or alkyl substituted phenyl having 7 to 24 carbon atoms as defined above.

In formula (I), the at least two moieties R$^1$ may be identical or different. Likewise, the at least two moieties X and the at least two moieties A may be identical or different.

In the context of formula (I), the moiety A is in particular O or a radical O—R$^A$—O.

In the context of formula (I) suitable linkers X are in particular saturated k+1 valent aliphatic or cycloaliphatic radicals usually from 2 to 20 or 3 to 20 carbon atoms, and which are unsubstituted or carry 1, 2 or 3 hydroxyl groups examples including C$_3$-C$_{10}$-alkan-1,2-diyl radicals, propan-1,3-diyl, butan-1,4-diyl, 2-hydroxypropan-1,3-diyl, 1,2,3-propantriyl, 1,2,3,4-butantetrayl, cyclohexan-1,2-diyl, cyclohexan-1,3-diyl, cylohexan-1,4-diyl.

In the context of formula (I), the moiety Peg$^1$ is in particular a linear polyethyleneoxide group, which is derived from a polyethyleneoxide having a number average weight in the range from 500 to 25000 g/mol, in particular from 1000 to 20000 g/mol.

Formula (II):

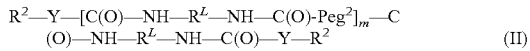

where
m is 1 to 5, in particular 1 to 3;
Peg$^2$ is a linear polyethyleneoxide block having 2 terminal oxygen atoms;
Y is O, a radical O—R$^A$—O or a linear poly-C$_2$-C$_3$-alkyleneoxide block having two terminal oxygen atoms, where R$^A$ is 2-hydroxypropan-1,3-diyl or C$_3$-C$_6$-alkandiyl;
R$^2$ is a linear or branched alkyl radical having 4 to 24 carbon atoms or alkyl substituted phenyl having 7 to 24 carbon atoms;
R$^L$ is a linker, derived from a diisocyanate.

In formula (II), the two moieties R$^2$ may be identical or different. Likewise, the at least two moieties Y and the at least two moieties R$^L$ may be identical or different.

In the context of formula (II), the moiety Y is in particular O, a radical O—R$^A$—O, where R$^A$ is 2-hydroxypropan-1,3-diyl or a radical O-(Alk-O)n, where A is 1,2-ethanediyl and/or propan-1,2-diyl, and n is an integer from 2 to 50, in particular 5 to 40.

In the context of formula (II) suitable linkers R$^L$ are those derived from aliphatic cycloaliphatic or aromatic diisocyanates, the linker R$^L$ usually being a bivalent hydrocarbon radical which has from 2 to 24 carbon atoms, in particular from 4 to 16 carbon atoms. Examples of diisocyanates, from which the linker R$^L$ is derived, include but are not limited to aliphatic diisocyanates such as tetramethylene diisocyanate, pentamethylene diisocyanate, hexamethylene diisocyanate (1,6-diisocyanatohexane, HDI), octamethylene diisocyanate, decamethylene diisocyanate, dodecamethylene diisocyanate, tetradecamethylene diisocyanate, trimethylhexane diisocyanate or tetramethylhexane diisocyanate, cycloaliphatic diisocyanates such as 1,4-, 1,3- or 1,2-diisocyanatocyclohexane, trans/trans, cis/cis and cis/trans isomers of 4,4'- or 2,4'-di(isocyanatocyclohexyl) methane (H$_{12}$MDI), 1-isocyanato-3,3,5-trimethyl-5-(isocyanatomethyl)cyclohexane (isophorone diisocyanate, IPDI), 2,2-bis(4-isocyanatocyclohexyl)-propane, 1,3- or 1,4-bis(isocyanatomethyl) cyclohexane or 2,4- or 2,6-diisocyanato-1-methylcyclohexane and aromatic diisocyanates such as toluene diisocyanate (TDI), methylene diphenyl isocyanate (MDI) or tetramethylxylylene diisocyanate (TMXDI).

In the context of formula (II), the moiety Peg$^2$ is in particular a linear polyethyleneoxide group, which is derived from a polyethyleneoxide having a number average weight in the range from 1000 to 25000 g/mol, in particular from 2000 to 15000 g/mol.

Formula (III):

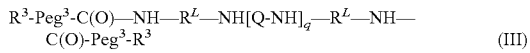

where
q is 1 or 2;
Q is C(O)—NH—R$^D$—NH—C(O) or C(O)—NH—R$^D$—NH—C(O)-Peg$^4$-C(O)—NH—R$^D$—NH—C(O);
Peg$^3$ is a linear polyethyleneoxide block having 2 terminal oxygen atoms;

Peg$^4$ is a linear polyethyleneoxide block having 2 terminal oxygen atoms;

R$^3$ is a linear or branched alkyl radical having 4 to 24 carbon atoms or alkyl substituted phenyl having 7 to 24 carbon atoms;

R$^L$ is a linker, derived from a diisocyanate; and

R$^D$ is a linker, derived from a diamine.

In formula (III), the two moieties R$^3$ may be identical or different. Likewise, the at least two moieties Peg$^3$ and the at least two moieties R$^L$ may be identical or different. If two groups Q are present, Q may be identical or different. In groups Q two moieties R$^D$ may also be different or identical.

In the context of formula (III) suitable linkers R$^D$ are those derived from aliphatic cycloaliphatic or aromatic diamines, the linker R$^D$ usually being a bivalent hydrocarbon radical which has from 2 to 24 carbon atoms, in particular from 4 to 16 carbon atoms. Examples of diamines, from which the linker R$^L$ is derived, include but are not limited to aliphatic diamines such as 1,3-diaminopropane, 1,4-diaminobutane, 1,6-diaminohexane, 1,5-diamino-3-oxapentane, 1,8-diaminooctane, 1,8-diamino-3,6-dioxaoctane, 1,6-diaminotrimethylhexane, cycloaliphatic diamines such as 1,4-, 1,3- or 1,2-diaminocyclohexane, trans/trans, cis/cis and cis/trans isomers of 4,4'- or 2,4'-di(aminocyclohexyl) methane, isophoronediamine (IPDA), 2,2-bis(4-aminocyclohexyl)-propane, 1,3- or 1,4-bis(aminomethyl)cyclohexane or 2,4- or 2,6-diamino-1-methylcyclohexane and aromatic diamines such as o-, m and p-xylylenediamine (OXD, MXD and PXD, respectively and tetramethylxylylene diamine.

In the context of formula (III) suitable linkers R$^L$ are those derived from aliphatic cycloaliphatic or aromatic diisocyanates, the linker R$^L$ usually being a bivalent hydrocarbon radical which has from 2 to 24 carbon atoms, in particular from 4 to 16 carbon atoms. Examples of diisocyanates, from which the linker R$^L$ is derived, include but are not limited to aliphatic diisocyanates such as tetramethylene diisocyanate, pentamethylene diisocyanate, hexamethylene diisocyanate (1,6-diisocyanatohexane, HDI), octamethylene diisocyanate, decamethylene diisocyanate, dodecamethylene diisocyanate, tetradecamethylene diisocyanate, trimethylhexane diisocyanate or tetramethylhexane diisocyanate, cycloaliphatic diisocyanates such as 1,4-, 1,3- or 1,2-diisocyanatocyclohexane, trans/trans, cis/cis and cis/trans isomers of 4,4'- or 2,4'-di(isocyanatocyclohexyl) methane (H$_{12}$MDI), 1-isocyanato-3,3,5-trimethyl-5-(isocyanatomethyl)cyclohexane (isophorone diisocyanate, IPDI), 2,2-bis(4-isocyanatocyclohexyl)-propane, 1,3- or 1,4-bis(isocyanatomethyl)cyclohexane or 2,4- or 2,6-diisocyanato-1-methylcyclohexane and aromatic diisocyanates such as toluene diisocyanate (TDI), methylene diphenyl isocyanate (MDI) or tetramethylxylylene diisocyanate (TMXDI).

In the context of formula (III), the moiety Peg$^4$ is in particular a linear polyethyleneoxide group, which is derived from a polyethyleneoxide having a number average weight in the range from 500 to 25000 g/mol, in particular from 2000 to 15000 g/mol.

In the context of formula (III), the moiety Peg$^4$ is in particular a linear polyethyleneoxide group, which is derived from a polyethyleneoxide having a number average weight in the range from 100 to 10000 g/mol, in particular from 200 to 5000 g/mol.

Preference is given to thickener polymers of the formulae (I) and (II).

Associative thickener polymers are well known and frequently described in the scientific literature, e.g. by E. J. Schaller et al., "Associative Thickeners" in Handbook of Coating Additives, Vol. 2 (Editor L. J. Calbo), Marcel Decker 192, pp. 105-164, J. Bieleman "PUR-Verdicker" in Additives for Coatings (Editor J. Bielemann), Wiley 2000, pp 50-58. NiSAT thickener polymers of the HEUR and HMPE type are also described in the patent literature, such as U.S. Pat. Nos. 4,079,028, 4,155,892, EP 61822, EP 307775, WO 96/31550, EP 612329, EP 1013264, EP 1541643, EP 1584331, EP 2184304, DE 4137247, DE 102004008015, DE 102004031786, US 2011/0166291 and WO 2012/052508. Apart from that, associative thickener polymers are commercially available. For example, NiSAT thickener polymers of the HEUR and HMPE type are commercially available, e.g. as Rheovis® PU types and Rheovis® PE types of BASF SE, Rheolate® types of Elementis PLC, Aquaflow® types of Ashland Inc., Acrysol® of Dow and TEGO® Visco Plus types of Evonik.

The amount of the associative thickener polymer will depend on the desired viscosity profile and is frequently in the range from 0.05 to 2.5% by weight, in particular 0.1 to 2% by weight of thickener, and especially 0.2 to 2% by weight, based on the latex paint.

In addition to the associative thickener polymer the latex paint may also contain one or more non-associative rheology modifiers. Suitable non-associative rheology modifiers are in particular cellulose based thickeners, especially hydroxyethyl cellulose, but also thickeners based on acrylate emulsions (ASE). Preference is given to non-associative cellulose based thickeners. The amount of the non-associative thickener polymer will depend on the desired viscosity profile and is frequently in the range from 0.05 to 1.5% by weight, in particular 0.1 to 0.8% by weight of thickener, and especially 0.15 to 0.8% by weight, based on the latex paint.

The aqueous latex paints of the invention may also comprise customary auxiliaries. The customary auxiliaries will depend from the kind of the coating and the binder in a well-known manner and include but are not limited to:

wetting agents or dispersants, filming auxiliaries, leveling agents, biocides and defoamers.

Wetting agents or dispersants are, for example, sodium polyphosphates, potassium polyphosphates or ammonium polyphosphates, alkali metal salts and ammonium salts of acrylic acid copolymers or maleic anhydride copolymers, polyphosphonates, such as sodium 1-hydroxyethane-1,1-diphosphonate, and naphthalenesulfonic salts, especially the sodium salts thereof.

Suitable filming auxiliaries are, for example, Texanol® from Eastman Chemicals and the glycol ethers and esters, commercially available, for example, from BASF SE under the Solvenon® and Lusolvan® names, and from Dow under the Dowanol® trade name. The amount is preferably <10% by weight and more preferably <5% by weight, based on the overall formulation. Formulation is also possible completely without solvents.

Further formulation ingredients for water-borne paints are described in detail in M. Schwartz and R. Baumstark "Water-based Acrylates for Decorative Coatings", Curt R. Vincentz Verlag, Hanover, 2001, p. 191-212 (ISBN 3-87870-726-6).

The latex paints of the invention can be produced in a manner known per se by blending the components in mixing apparatuses customary for the purpose.

It has been found to be beneficial to prepare the latex paints of the invention by a two or three-step process, wherein in a first step an aqueous suspension of the titanium dioxide pigment, optionally further pigments and/or fillers is prepared in the presence of the polymeric dispersant PD in order to obtain a stabilized suspension of the pigment. In a second step the further ingredients of the latex paints, namely the aqueous polymer latex, the associative thickener polymer and optionally further ingredients, such as water and formulation auxiliaries are added.

It is also possible, but not necessary, to prepare an aqueous suspension, e.g. a slurry or paste, of the $TiO_2$ pigment in the presence of the pigment dispersant polymer PD and at least a portion of the polymer latex of the invention and optionally further pigments and/or fillers, water and then to mix the thus obtained slurry or paste with further aqueous polymer latex, the associative thickener polymer and optionally further auxiliaries. Frequently, the associative thickener polymer is added before the addition of the polymer latex. It may also be possible to add the associative thickener polymer after the polymer latex had been added to the aqueous suspension of the pigment.

The latex paints are used for coating surfaces, in particular for interior or exterior walls or ceilings. The latex paint may be applied to substrates to be coated in a customary manner, for example by applying the paint with brushes or rolls, by spraying, by dipping, by rolling, or by bar coating.

In this case, the coating of substrates is effected in such a way that the substrate is first coated with an aqueous coating formulation of the invention and then the aqueous coating is subjected to a drying step, especially within the temperature range of $\geq -10$ and $\leq 50°$ C., advantageously $\geq 5$ and $\leq 40°$ C. and especially advantageously $\geq 10$ and $\leq 35°$ C. Eventually, a curing step may be performed afterwards, if the coating composition contains a curable binder.

The invention is to be illustrated by non-limiting examples which follow.

EXAMPLES

1. Analytics
1.1 The solids content was determined by drying a defined amount of the aqueous polymer dispersion (about 2 g) to constant weight in an aluminum crucible having an internal diameter of about 5 cm at 120° C. in a drying cabinet (about 2 hours). Two separate measurements were conducted. The value reported in the example is the mean of the two measurements.
1.2 The particle diameter of the polymer latex was determined by dynamic light scattering of an aqueous polymer dispersion diluted with deionized water to 0.001 to 0.5% by weight at 22° C. by means of a High Performance Particle Sizer (HPPS) from Malvern Instruments, England. What is reported is the cumulant Z average diameter calculated from of the measured autocorrelation function (ISO Standard 13321).
1.3 The glass transition temperature was determined by the DSC method (Differential Scanning calorimetry, 20 K/min, midpoint measurement, DIN 53765:1994-03) by means of a DSC instrument (Q 2000 series from TA instruments).
1.4 The molecular weight of the polymer dispersant was determined by GPC at 22° C. using 0.15% by weight solutions of the respective dispersant PD, using 0.01 mol/L aqueous phosphate buffer pH 7.4, containing 0.01 mol/L $NaN_3$ as ab eluent and hydroxylated polymethacrylate gel as stationary phase.
1.5 The viscosities of the latex paints were determined with a rotational viscosimeter (Anton Paar MCR 302 ro Anton Paar MCR 102) in cone-plate geometry at a shear rate of 100 $s^{-1}$ and 22° C.

2. Starting Materials
Emulsifier solution 1: 15% by weight aqueous solution of sodium dodecylsulfate.
Seed latex: 33% by weight aqueous polystyrene latex having an average particle size in the range of 10-50 nm.
Associative Thickener: A commercial HMPE of the formula (I) having a molecular weight (number average) of 20.000 obtained by reacting a polyethyleneoxide with epichlorhydrin and a OH functional compound having an isotridecanyl radical.
Non associative Thickener: 3% by weight aqueous solution of a hydroxethyl cellulose (Natrosol® 250 HBR of Ashland).

2.1 Preparation of the polymer latex
2.1.1 Comparative Latex CD1
A polymerization vessel equipped with metering units and closed-loop temperature control was initially charged at 20 to 25° C. (room temperature) under a nitrogen atmosphere with 153.9 g of deionized water and 26.5 g of the seed latex, and heated to 90° C. while stirring. On attainment of this temperature, 2.6 g of feed 2 were added and the mixture was stirred at 90° C. for further 5 min. Then, while maintaining the temperature, simultaneously feed 1 and the remainder of feed 2 were started. Feed 1 was metered at constant feed rate into the reaction within 150 min. and feed 2 was metered at constant feed rate into the reaction vessel within 165 min., while stirring was continued and the temperature of 90° C. was maintained. Parallel to feed 1, feed 1A was started and metered in parallel to feed 1 into the reaction vessel within 150 min. After having metered feed 2 completely into the reaction vessel, stirring at 90° C. was continued for 15 min. Then, feed 3 was added and stirring at 90° C. was continued for 5 min. Then, feed 4 and feed 5 were started simultaneously and metered into the reaction vessel within 90 minutes while maintaining the temperature of 90° C. Thereafter feed 6 was added followed by the addition of 27.5 g of water. The obtained polymer latex was cooled to ambient temperature and filtered through a 125 μm filter. Thereby, 996.6 g of an aqueous polymer latex was obtained, which had a solid content of 50.5% and a pH of 7.9. The aqueous polymer dispersion diluted with deionized water had a median particle diameter of 113 nm, determined by means of dynamic light scattering. The particle diameter of the diluted aqueous polymer dispersion at pH 12 was 114 nm.

Feed 1 (Emulsion of):
170.2 g deionized water
33.3 g emulsifier solution 1
12.5 g acrylic acid
240.0 g styrene and
240.0 g n-butyl acrylate Feed 1A (Aqueous Solution of):
7.5 g methacrylic acid
22.5 g deionized water Feed 2 (Homogeneous Solution of):
33.2 g deionized water and
2.5 g sodium peroxodisulfate Feed 3
8.0 g 25% by weight aqueous solution of ammonia Feed 4
7.5 g 10% by weight aqueous solution of tert-butyl hydroperoxide Feed 5
9.5 g 13.1% by weight aqueous solution of sodium acetone bisulfite Feed 6
2.0 g 25% by weight aqueous solution of ammonia 2.1.2 Latex D2 According to the Invention The emulsion polymerization was performed by the protocol of comparative latex CD1, except for the following: After having metered 16.7% of feed 1 (116.2 g) into the reaction vessel, feed 1A was started and metered into the reaction vessel within 5 min. Thereby, 996.6 g of an aqueous polymer latex was obtained, which had a solid content of 50.7% and a pH of 7.9. The aqueous polymer dispersion diluted with deionized water had a particle diameter of 113 nm, determined by means of dynamic light scattering. The median particle diameter of the diluted aqueous polymer dispersion at pH 12 was 186 nm.

2.1.3 Latex D3 According to the Invention

A polymerization vessel equipped with metering units and closed-loop temperature control was initially charged at 20 to 25° C. (room temperature) under a nitrogen atmosphere with 256.3 g of deionized water and 21.2 g of the seed latex, and heated to 85° C. while stirring. On attainment of this temperature, 4.3 g of feed 2 were added and the mixture was stirred at 85° C. for further 5 min. Then, while maintaining the temperature, simultaneously feed 1 and the remainder of feed 2 were started. Feed 1 was metered at constant feed rate into the reaction within 190 min. and feed 2 was metered at constant feed rate into the reaction vessel within 210 min., while stirring was continued and the temperature of 85° C. was maintained. After having metered 10.5% of feed 1 (102.1 g), feed 1A was started and metered in parallel to feed 1 into the reaction vessel within 10 min. After having metered feed 2 completely into the reaction vessel, stirring at 85° C. was continued for 6 min. Then, feed 3 was added within 10 min and stirring at 80° C. was continued. Then, feed 4 and feed 5 were started simultaneously and metered into the reaction vessel within 60 minutes while maintaining the temperature of 80° C. Thereafter feed 6 was added. The obtained polymer latex was cooled to ambient temperature and filtered through a 125 µm filter. Thereby, 1438 g of an aqueous polymer latex was obtained, which had a solid content of 50.1% and a pH of 8.1. The aqueous polymer dispersion diluted with deionized water had a particle diameter of 135 nm, determined by means of dynamic light scattering.

Feed 1 (Emulsion of):
204.7 g deionized water
93.3 g emulsifier solution 1
2.4 g acrylic acid
90.0 g 7% by weight aqueous solution of itaconic acid
11.1 g acrylamide
325.0 g methyl methacrylate and
358.4 g n-butyl acrylate
3.5 g ethylene diamine tetracetate
1.8 g 10% by weight aqueous solution of ammonia Feed 1A (Aqueous Solution of):
33.0 g 7% by weight aqueous solution of itaconic acid
16.4 g deionized water
0.6 g 10% by weight aqueous solution of ammonia Feed 2 (Homogeneous Solution of):
60.0 g deionized water and
1.05 g sodium peroxodisulfate Feed 3
41.5 g 2.5% by weight aqueous solution of ammonia Feed 4
14.0 g 5% by weight aqueous solution of tert-butyl hydroperoxide Feed 5
14.0 g 5% by weight aqueous solution of acetone disulfit Feed 6
14.0 g 10% by weight aqueous solution of ammonia 2.1.4 Comparative Latex CD4

A polymerization vessel equipped with metering units and closed-loop temperature control was initially charged at 20 to 25° C. (room temperature) under a nitrogen atmosphere with 256.3 g of deionized water and 21.2 g of the seed latex, and heated to 85° C. while stirring. On attainment of this temperature, 4.9 g of feed 2 were added and the mixture was stirred at 85° C. for further 5 min. Then, while maintaining the temperature, simultaneously feed 1 and the remainder of feed 2 were started. Feed 1 was metered at constant feed rate into the reaction within 190 min. and feed 2 was metered at constant feed rate into the reaction vessel within 210 min., while stirring was continued and the temperature of 85° C. was maintained. After having metered feed 2 completely into the reaction vessel, stirring at 85° C. was continued for 6 min. Then, feed 3 was added within 10 min and stirring at 80° C. was continued. Then, feed 4 and feed 5 were started simultaneously and metered into the reaction vessel within 60 minutes while maintaining the temperature of 80° C. Thereafter feed 6 was added. The obtained polymer latex was cooled to ambient temperature and filtered through a 125 µm filter. Thereby, 1436 g of an aqueous polymer latex was obtained, which had a solid content of 49.7% and a pH of 8.1. The aqueous polymer dispersion diluted with deionized water had a particle diameter of 134 nm, determined by means of dynamic light scattering.

Feed 1 (Emulsion of):
204.7 g deionized water
93.3 g emulsifier solution 1
12.5 g acrylic acid
11.1 g acrylamide
337.0 g methyl methacrylate and
358.4 g n-butyl acrylate
3.5 g 1% by weight aqueous solution of ethylene diamine tetracetate sodium salt Feed 2 (Homogeneous Solution of):
65.0 g deionized water and
1.05 g sodium peroxodisulfate Feed 3
50.0 g 2.6% by weight aqueous solution of ammonia Feed 4
14.0 g 5% by weight aqueous solution of tert-butyl hydroperoxide Feed 5
14.0 g 5% by weight aqueous solution of acetone disulfit Feed 6
10.0 g 10% by weight aqueous solution of ammonia 2.1.5 Comparative Latex CD5

A polymerization vessel equipped with metering units and closed-loop temperature control was initially charged at 20 to 25° C. (room temperature) under a nitrogen atmosphere with 156.4 g of deionized water and 9.1 g of the seed latex, and heated to 90° C. while stirring. On attainment of this temperature, 2.6 g of feed 2 were added and the mixture was stirred at 90° C. for further 5 min. Then, while maintaining the temperature, simultaneously feed 1, feed 1A and feed 1B and the remainder of feed 2 were started and metered at constant feed rate into the reaction vessel within 120 min., while stirring was continued and the temperature of 90° C. was maintained. After having metered the feeds completely into the reaction vessel, stirring at 90° C. was continued for 20 min. Then, feeds 3 and 4 were started simultaneously and metered into the reaction vessel within 60 minutes while maintaining the temperature of 90° C. The obtained polymer latex was cooled to ambient temperature and filtered through a 125 µm filter. After neutralization with $NH_3$, 997 g of an aqueous polymer latex was obtained, which had a solid content of 51.4% and a pH of 7.4. The aqueous polymer dispersion diluted with deionized water had a median particle diameter of 159 nm, determined by means of dynamic light scattering. The particle diameter of the diluted aqueous polymer dispersion at pH 12 was 186 nm.

Feed 1 (Emulsion of):
195.4 g deionized water
33.3 g emulsifier solution 1
6.5 g acrylic acid
277.8 g methyl metacrylate and
211.8 g 2-ethylhexyl acrylate Feed 1A:
7.5 g methacrylic acid Feed 1B:
22.0 g deionized water Feed 2 (Homogeneous Solution of):
8.6 g 7% by weight aqueous solution of sodium peroxodisulfate Feed 3
7.5 g 10% by weight aqueous solution of tert-butyl hydroperoxide Feed 4
3.8 g 13.1% by weight aqueous solution of sodium acetone bisulfite
7.3 g deionized water 2.1.6 Latex D6

The polymerization was performed by the protocol of comparative latex CD5, except for the following. After having metered 16.7% of feed 1 (120.8 g), feed 1A and feed 1B were started simultaneously and metered into the reaction vessel within 5 min.

Thereby, 997 g of an aqueous polymer latex was obtained, which had a solid content of 51.3% and a pH of 7.4. The aqueous polymer dispersion diluted with deionized water had a median particle diameter of 157 nm, determined by means of dynamic light scattering. The particle diameter of the diluted aqueous polymer dispersion at pH 12 was 226 nm.

2.1.7 Latex D7

The polymerization was performed by the protocol of comparative latex CD5, except for the following. After having metered 16.7% of feed 1 (120.8 g), feed 1A and feed 7 were started simultaneously and metered into the reaction vessel within 5 min. Instead of 9.1 g of seed latex, 21.83 g of seed latex were used.

Feed 7
12.0 g 2-ethylehxyl acrylate
2.0 g methacrylic acid
1.3 g 2-ethylehxyl thioglycolate Thereby, 1015 g of an aqueous polymer latex was obtained, which had a solid content of 51.4% and a pH of 7.3. The aqueous polymer dispersion diluted with deionized water had a median particle diameter of 130 nm, determined by means of dynamic light scattering. The particle diameter of the diluted aqueous polymer dispersion at pH 12 was 167 nm.

2.2 Preparation of the Dispersant PD1

In a 5-necked 200 mL Sulfier flask with an overhead stirrer, thermometer, reflux condenser and septum, 47.82 g of iso-propanol and 8.44 g of distilled water was purged with $N_2$ for 30 minutes and heated to 82° C. (reflux). An initiator solution containing 0.17 g of ammonium persulfate and 0.65 g of distilled water was added all at once to the reactor by syringe (Shot 1). Following shot 1, a mixture of 34.88 g of acrylic acid and 25.78 g distilled water (Feed 1) was fed to the reactor over 3 hours via a syringe pump. Starting simultaneously with Feed 1, an initiator solution (Feed 2) containing 1.57 g of ammonium persulfate and 2.62 g of distilled water was fed to the reactor over 3.5 hours via a syringe pump. After the completion of Feed 2, the reaction was allowed to react at 86° C. for a further 60 minutes. The solvent was distilled off azeotropically by heating the oil bath surrounding the reaction flask to 120° C. and collecting the distillate until the inner reactor temperature reached 98° C. The resulting polymer/water solution was neutralized with 25% by weight aqueous solution of sodium hydroxide and solids content was adjusted to with water to 45% by weight. The pH of the polymer solution was pH 8.5.

The number average molecular weight $M_n$ of the polymer dispersant was 1.480 g/mol and the weight average molecular weight $M_w$ of the polymer dispersant was 2.910 g/mol, as determined by GPC in accordance with the protocol 1.4.

3 Preparation of the Latex Paint (General Procedure)

A paint formulation was prepared by the following protocol:

180.0 g deionized water was mixed with
1.2 g of the aqueous solution of the pigment dispersant and the mixture was adjusted to pH 9.6 by NaOH. Then
190.0 g $TiO_2$ pigment were added with stirring, followed by the addition of
0.7 g defoamer (based on silicon oil)
100.0 g 3% by weight aqueous solution of a hydroxyethyl cellulose
10.0 g propylene glycol
10.0 g butyl diglycol
5.0 g Texanol
410.0 g polymer latex (50% by weight)
1.5 g defoamer (based on silicon oil)
16.7 g solution of associative thickener polymer (30% by weight aqueous solution) and
75.0 g water.

The overall solids content of the paint was 39% by weight, the PVC was 20%.

For comparative purposes, the solution of the associative thickener polymer in the above recipe was replaced by the same amount of water.

Opacity, respectively hiding power, was quantified by spreading rate measurements. These measurements were performed by applying different film thicknesses using a draw-down bar i.e. doctor blade (e.g. 150, 200, 220 and 250 micrometer wet) onto a defined contrast paper, e.g. Leneta foil with black & white areas and subsequent measurement of contrast ratios. Afterwards, the values are interpolated to yield the so called spreading rate, which is the reciprocal of the volume of the paint per area [$m^2$/L] (inverse of the film thickness) which is required to cover a substrate at a given contrast ratio, e.g. 98% for a Class II hiding paint according to ISO DIN 13300.

The results are summarized in the following tables:

TABLE 1

Results for inventive pigment dispersant PD1

| | | Pigment dispersant | | Spreading rate [1)] [$m^2$/L] | | Delta |
| Example | Binder | type | Amount [%] [2)] | With [1a)] | Without [1b)] | Spreading rate |
|---|---|---|---|---|---|---|
| 1 | D2 | PD1 | 0.15 | 6.5 | 6.3 | 0.2 |
| 2 | D2 | PD1 | 0.50 | 6.3 | 6.5 | −0.2 |
| 3 | D2 | PD1 | 0.75 | 6.8 | 6.8 | 0 |

TABLE 1-continued

Results for inventive pigment dispersant PD1

| Example | Binder | Pigment dispersant type | Amount [%] [2] | Spreading rate [1] [m²/L] With [1a] | Without [1b] | Delta Spreading rate |
|---|---|---|---|---|---|---|
| V1 | CD1 | PD1 | 0.15 | 3.8 | 5.6 | −1.8 |
| V2 | CD1 | PD1 | 0.50 | 3.5 | 6.1 | −2.6 |
| V3 | CD1 | PD1 | 0.75 | 2.8 | 6.1 | −3.3 |
| 4 | D3 | PD1 | 0.15 | 6.1 | 6.8 | −0.7 |
| 5 | D3 | PD1 | 0.50 | 6.1 | 6.9 | −0.8 |
| V4 | CD4 | PD1 | 0.15 | 5.4 | 6.7 | −1.3 |
| V5 | CD4 | PD1 | 0.50 | 5.3 | 6.5 | −1.2 |
| 6 | D6 | PD1 | 0.50 | 7.1 | 7.1 | 0 |
| 7 | D7 | PD1 | 0.50 | 7.2 | 7.2 | 0 |
| V7 | CD5 | PD1 | 0.50 | 4.1 | 7.0 | −2.9 |

[1] Spreading rate at 98% contrast ratio
[1a] with associative thickener polymer and
[1b] without associative thickener polymer;
[2] amount of pigment dispersant in % by weight, based on the titanium dioxide.

From the results summarized in table 1 it is apparent that the binders according to the invention better compensate the negative effects of associative thickeners on the spreading rate and hence on the hiding power of the paint.

The rheology of the paints was tested as described under 1.5 directly after the preparation of the latex paint and after two weeks storage at 50° C. The results are summarized in table 3:

TABLE 3

Results for inventive pigment dispersant PD1

| Example | Binder | Pigment dispersant type | Amount [%] [1] | Viscosity [mPas] Fresh | After Storage[2] | Delta Viscosity [%] |
|---|---|---|---|---|---|---|
| 1 | D2 | PD1 | 0.15 | 1130 | 1100 | −3 |
| 2 | D2 | PD1 | 0.50 | 1150 | 1270 | +10 |
| 3 | D2 | PD1 | 0.75 | 1130 | 1170 | +4 |
| V1 | CD1 | PD1 | 0.15 | 833 | 760 | −9 |
| V2 | CD1 | PD1 | 0.50 | 713 | 662 | −7 |
| V3 | CD1 | PD1 | 0.75 | 766 | 726 | −5 |

[1] amount of pigment dispersant in % by weight, based on the titanium dioxide
[2] 2 weeks at 50° C.

4 Investigation of the Aqueous Polymer Composite Dispersions by Analytical Ultracentrifugation
4.1: Preparation of Composites from Polymer Latex CD1, D2, D3 and CD4 and Pigment Dispersants PD1

An aqueous $TiO_2$ slurry was prepared by mixing 70 parts by weight of a commercial $TiO_2$ pigment (Kronos® 2190) with an aqueous solution of 0.25 parts by weight of the dispersant PD1 in 29.75 parts by weight of water and treating the mixture with a dissolver (Dispermat CA20 M-1, 2007 with 4 cm dissolver disc—VMA Getzmann) at 1200-1500 rpm for 15 minutes. For preparing the composite material, 20 parts by weight of the aqueous $TiO_2$ slurry were mixed with 10.24 parts by weight of a polymer latex (50% by weight) as described herein such that the mixture contained about 37% by weight of polymer, based on 100% of $TiO_2$ pigment. The mixture was treated with the above dissolver at 800-1000 rpm for 15 min. Subsequently, the pH was adjusted to pH 8.5.

Before the measurements of the composites were performed, the composites were left for at least 24 h at 22° C.
4.2: Determination of the Adsorption of Latex CD1, D2, D3 or CD4 on $TiO_2$ The aqueous polymer composite dispersions prepared by the protocol described in item 4.1 were diluted with Milli-Q Advantage A10 water set at pH 8.5 to a polymer concentration of 2 g/L. The diluted dispersions were analyzed in an ultracentrifuge type Beckman Optima XL-I (Beckman Instruments, Palo Alto, USA) with optical interference detection (675 nm) using a AN 50 Ti®-rotor with 8 measurement cells. The sedimentation velocity runs allow for recording the change of the radial concentration profile of the particles which differ in their sedimentation for the whole measurement period. In situ detection of the particle sedimentation in the centrifugal field allows for optimal separation of pigment and free polymer particles of the latex (free latex particles) and also for direct measurement of the concentration of the free latex particles. Typically at about 8000 rpm the free latex particles form a front which sediments towards the bottom of the measurement cell. Sedimentation can be detected by the optical interference detection as a vertical shift of the interference fringes. The shift is proportional to the specific refractive index increment of the polymer and the absolute concentration of the latex particles. The specific refractive index increment of the polymer had been previously determined by measuring a control of the latex without pigment.

The diluted aqueous polymer composite dispersions were centrifuged at <3000 rpm for 10 minutes. Thereby, the rapidly sedimenting $TiO_2$ particles and, if present, the latex-pigment composite particles are separated from the free latex particles. Then the rotational speed was incrementally increased to about 8000 rpm in order to analyze the free latex particles. The thus determined relative amount of free latex is subtracted from 100% to determine the amount of bound latex and the results are summarized in table 4. As a control, the respective latex was diluted with Milli-Q Advantage A10 water set at pH 8.5 to a polymer concentration of 2 g/L, and analyzed in parallel in one of the measurement cells.

TABLE 4

| Example | Binder | Pigment dispersant type | Amount [%][2) | Latex bound in composite [% by weight] |
|---|---|---|---|---|
| 1 | D2 | PD1 | 0.15 | 81 |
| 2 | D2 | PD1 | 0.50 | 74 |
| 3 | D2 | PD1 | 0.75 | 63 |
| V1 | CD1 | PD1 | 0.15 | 33 |
| V2 | CD1 | PD1 | 0.50 | 0 |
| V3 | CD1 | PD1 | 0.75 | 0 |
| 4 | D3 | PD1 | 0.15 | 61 |
| 5 | D3 | PD1 | 0.50 | 36 |
| V4 | CD4 | PD1 | 0.15 | 54 |
| V5 | CD4 | PD1 | 0.50 | 0 |
| 6 | D6 | PD1 | 0.50 | 37 |
| V7 | CD5 | PD1 | 0.50 | 0 |

The invention claimed is:

1. A latex paint, comprising:
   a) a multistage carboxylated polymer latex binder obtained by multistage aqueous emulsion polymerisation of a monomer composition M consisting of
      at least one non-ionic monomer M1, which is selected from $C_1$-$C_{20}$-alkyl esters of acrylic acid, $C_1$-$C_{20}$-alkylesters of methacrylic acid, and vinyl aromatic monomers,
      one or more monoethylenically unsaturated monomers M2, which are selected from monoethylenically unsaturated monocarboxylic acids having 3 to 6 carbon atoms and monoethylenically unsaturated dicarboxylic acids having 4 to 6 carbon atoms, and
      optionally one or more non-ionic monomers M3, which are different from monomers M1,
      where in at least one stage, the relative amount of monomers M2 added in said stage is at least 6% by weight, based on the total amount of monomers added in said stage, the total amount of monomers M2 being from 0.05 to 5% by weight, based on the total amount of the monomer composition M;
   b) a titanium dioxide pigment;
   c) a polymeric dispersant PD which is selected from homo and copolymers of monomers M4, which are selected from monoethylenically unsaturated monocarboxylic acids having 3 to 6 carbon atoms and monoethylenically unsaturated dicarboxylic acids having 4 to 6 carbon atoms,
      wherein the monomers M4 make up at least 95 mol-% of the monomers forming the polymeric dispersant, and where the polymeric dispersant PD has a number average molecular weight, as determined by GPC, of at most 6000 Dalton; and
   d) an associative thickener polymer and
   where the monomer composition M is polymerized by a multistage emulsion polymerisation process, where at least 95% of the monomer composition M to be polymerised are metered during a period P to the polymerisation reaction under polymerisation conditions,
      wherein during at least one period P(n) within said period P the relative amount of monomers M2, which are metered to the polymerisation reaction during the periods P(n), to the total amount of the monomers metered to the polymerisation reaction during said period P(n), is increased from less than 0.05:1 to at least 0.06:1 and decreased to less than 0.05:1 at the end of each of said period(s) P(n).

2. The latex paint of claim 1, wherein the polymer particles of the multistage polymer latex binder at pH 12 and 22° C. have a Z average particle diameter of 1.1 to 1.8 times of the Z average diameter of the polymer latex at pH 8 and 22° C., as determined by dynamic light scattering of a 0.01% by weight aqueous dilution of the latex at the respective pH.

3. The latex paint of claim 1, where the polymer particles of the multistage polymer latex binder have a Z average particle diameter in the range from 50 to 500 nm, as determined by dynamic light scattering of a 0.01% by weight aqueous dilution of the latex at pH 8 and 22° C.

4. The latex paint of claim 1, wherein the monomers M1 are a mixture of:
   at least one monomer M1a, selected from $C_1$-$C_{20}$-alkyl esters of acrylic acid and $C_5$-$C_{20}$-alkylesters of methacrylic acid; and
   at least one monomer M1b, selected from vinyl aromatic monomers, $C_1$-$C_4$-alkyl esters of methacrylic acid and mixtures thereof.

5. The latex paint of claim 4, where the monomers M1a are selected from $C_2$-$C_{10}$-alkyl esters of acrylic acid.

6. The latex paint of claim 1, where the monomers M1 comprise at least one vinylaromatic monomer.

7. The latex paint of claim 1, where the monomers M2 are selected from acrylic acid, methacrylic acid and mixtures thereof.

8. The latex paint of claim 1, where the monomers M3 are selected from hydroxyalkylesters of acrylic acid, hydroxyalkylesters of methacrylic acid, acrylamide, methacrylamide and mixtures thereof.

9. The latex paint of claim 1, where the monomer composition M consists of:
   80 to 99.95% by weight, based on the total weight of the monomer composition M, of ethylenically unsaturated monomers M1;
   0.05 to 5% by weight, based on the total weight of the monomer composition M, of one or more monoethylenically unsaturated monomers M2; and
   0 to 20% by weight of non-ionic monomers M3.

10. The latex paint of claim 1,
    wherein the first period P(n) starts at a point of time t(s) and the last period P(n) ends at a point of time t(e),
    where t(s) is at a point of time, where at least 10% of the total amount of the monomer composition M to be polymerised have been metered to the polymerisation reaction and where t(e) is at a point of time, where at most 90% of the total amount of the monomer composition M to be polymerised have been metered into the polymerisation reaction.

11. The latex paint of claim 1, where the multistage emulsion polymerisation process has at least one of the following features i), ii), iii), iv), v) or vi):
    i) the total amount of monomers M2 added during the at least one period P(n) to the polymerisation reaction is at least 20% of the monomers M2 contained in the monomer composition M;
    ii) the relative amount of monomers M2 added during all of periods P(n) to the polymerisation reaction is from 0.1 to 3% by weight, based on the total weight of the monomer composition M;

iii) the total amount of monomers M2 is from 0.2 to 5% by weight, based on the total weight of the monomer composition M;
iv) the ratio of the total duration of all periods P(n) to the duration of the period P is from 0.002:1 to 0.5:1;
v) the period P is from 0.5 h to 5 h;
vi) the total duration of all periods P(n) is from 0.5 min to 1 h.

12. The latex paint of claim 1, where the weight ratio of polymer latex, calculated as solids, to titanium dioxide pigment is from 0.1:1 to 5:1.

13. The latex paint of claim 1, where the polymeric dispersant PD is exclusively formed from monomers M4.

14. The latex paint of claim 1, where the monomers forming the polymeric dispersant PD comprise at least 85 mol-% of acrylic acid, based on the total amount of the monomers forming the polymeric dispersant.

15. The latex paint of claim 1, where the polymeric dispersant PD has a number average molecular weight, as determined by GPC, of at most 5000 Dalton.

16. The latex paint of claim 1, wherein the associative thickener polymer is a linear or branched block copolymer having at least one interior polyethylene oxide block and terminal hydrocarbon groups each having at least 4 carbon atoms.

17. A coating method, comprising coating a surface with the latex paint of claim 1.

* * * * *